(12) United States Patent
Miyagawa et al.

(10) Patent No.: US 7,345,661 B2
(45) Date of Patent: Mar. 18, 2008

(54) DISPLAY DEVICE AND ELECTRONIC EQUIPMENT

(75) Inventors: Keisuke Miyagawa, Kanagawa (JP); Hajime Kimura, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 637 days.

(21) Appl. No.: 10/695,411

(22) Filed: Oct. 29, 2003

(65) Prior Publication Data

US 2004/0239231 A1 Dec. 2, 2004

(30) Foreign Application Priority Data

Oct. 30, 2002 (JP) ............................. 2002-316061

(51) Int. Cl.
G09G 3/32 (2006.01)
(52) U.S. Cl. ........................................................ 345/82
(58) Field of Classification Search ................ 345/8, 345/32, 82, 76, 80, 211; 315/169.3; 313/504, 313/498; 359/291
See application file for complete search history.

(56) References Cited

U.S. PATENT DOCUMENTS

| | | |
|---|---|---|
| 5,500,765 A | 3/1996 | Eichenlaub |
| 5,731,853 A | 3/1998 | Taketomi et al. |
| 5,864,375 A | 1/1999 | Taketomi et al. |
| 5,969,850 A | 10/1999 | Harrold et al. |
| 6,014,187 A | 1/2000 | Taketomi et al. |
| 6,157,424 A | 12/2000 | Eichenlaub |
| 6,222,672 B1 | 4/2001 | Towler et al. |
| 6,574,487 B1 | 6/2003 | Smith et al. |
| 6,825,985 B2 * | 11/2004 | Brown et al. ............... 359/619 |

(Continued)

FOREIGN PATENT DOCUMENTS

CN 1160258 A 9/1997

(Continued)

OTHER PUBLICATIONS

Exhibition of Active Matrix Type Organic EL Display at "13th Flat Panel Display Manufacturing Technology Expo & Conference" by ELDis Group (in Japanese with full translation); Jul. 2, 2003.

(Continued)

Primary Examiner—Richard Hjerpe
Assistant Examiner—Abbas I. Abdulselam
(74) Attorney, Agent, or Firm—Fish & Richardson P.C.

(57) ABSTRACT

It is an object of the present invention to provide a display device that is able to display a three-dimensional image without reducing resolution in displaying a two-dimensional image to half, and prevent the device itself from being bulky. This display device is a display device that has a light-emitting device having a plurality of pixels and an optical system at one side of the light-emitting device, where the light-emitting element has two electrodes that both have translucency, light is shielded by the first shield means and light is shielded by the second shield means, and the optical system makes light emitted from one of two adjacent pixels of the plurality of pixels incident into a let eye of a viewer and makes light emitted from the other incident into a right eye of the viewer by controlling a traveling direction of light emitted from the plurality of pixels.

17 Claims, 23 Drawing Sheets

U.S. PATENT DOCUMENTS 7,151,217 B2 * 12/2006 Forrest et al. .............. 136/263

FOREIGN PATENT DOCUMENTS

| EP | 0729055 A2 | | 8/1996 |
|----|------------|---|--------|
| EP | 833 183 | | 4/1998 |
| EP | 919 847 | | 6/1999 |
| GB | 2364462 | | 1/2002 |
| JP | 08-036145 | | 2/1996 |
| JP | 08-336164 | | 12/1996 |
| JP | 10-198291 | | 7/1998 |
| JP | 10-208884 | | 8/1998 |
| JP | 2000-056263 | | 2/2000 |
| JP | 2000-197075 | * | 7/2000 |
| JP | 2002-372929 | | 12/2002 |
| JP | 3408154 | | 3/2003 |

OTHER PUBLICATIONS

Documents distributed in the "13th Flat Panel Display Manufacturing Technology Expo & Conference" by ELDis Group (5 pages).

"Two-way display developed"; *The Japan Times;* (1page); Jul. 3, 2003.

"Mass Production of Organic EL Devices"; *Shimotsuke Newspaper(in Japanese with full translation)*; Jul. 3, 2003.

International Search Report (Application No. PCT/JP03/13554) dated Jan. 20, 2004.

Kwan Hee Lee et al.; "2.2 QCIF Full Color Transparent AMOLED Display"; *SID 2003 Digest;* pp. 104-107; 2003.

European Search Report (Application No. 03758821.7) dated Jul. 14, 2006, 4 pages.

Naoki Tanaka, "Liquid Crystal Display That Could Boost Sales of PCs and Cellular Phones", Ceatec Japan 2000, *Nikkei Microdevices,* Oct. 2002, pp. 91-96 and full English Translation.

* cited by examiner

Fig. 8(A)

| D1 | D2 | D3 | D4 | D5 | D6 | D7 |
|----|----|----|----|----|----|----|
| D8 | D9 | D10 | D11 | D12 | D13 | D14 |
| D15 | D16 | D17 | D18 | D19 | D20 | D21 |
| D22 | D23 | D24 | D25 | D26 | D27 | D28 |
| D29 | D30 | D31 | D32 | D33 | D34 | D35 |

Column-Scanning Direction →, Row-Scanning Direction ↓

Fig. 8(B) (Other Side of Fig. 8(A))

| D7 | D6 | D5 | D4 | D3 | D2 | D1 |
|----|----|----|----|----|----|----|
| D14 | D13 | D12 | D11 | D10 | D9 | D8 |
| D21 | D20 | D19 | D18 | D17 | D16 | D15 |
| D28 | D27 | D26 | D25 | D24 | D23 | D22 |
| D35 | D34 | D33 | D32 | D31 | D30 | D29 |

Column-Scanning Direction ←, Row-Scanning Direction ↓

Fig. 8(C) (Other Side of Fig. 8(A))

| D29 | D30 | D31 | D32 | D33 | D34 | D35 |
|----|----|----|----|----|----|----|
| D22 | D23 | D24 | D25 | D26 | D27 | D28 |
| D15 | D16 | D17 | D18 | D19 | D20 | D21 |
| D8 | D9 | D10 | D11 | D12 | D13 | D14 |
| D1 | D2 | D3 | D4 | D5 | D6 | D7 |

Column-Scanning Direction →, Row-Scanning Direction ↑

θ = 0°

θ = 30°

DISPLAY DEVICE AND ELECTRONIC EQUIPMENT

TECHNICAL FIELD

The present invention relates to a display device that uses a light-emitting device that is able to switch between a two-dimensional image display and a three-dimensional image display. The light-emitting device includes a panel that has a light-emitting element sealed and a module that has a circuit, such as an IC including a controller, mounted on the panel. The present invention further relates to an electronic equipment that uses the display device.

BACKGROUND ART

When a difference in retinal image between both eyes (binocular parallax), which is probably generated when an object is watched with both eyes, is nonrandomly produced in a display device, it is possible to make human eyes recognize a three-dimensional image. Various display devices for a three-dimensional image, which use this principle of binocular parallax, have been developed. The display devices for a three-dimensional image are broadly classified into a type with specific spectacles for binocular vision or a type without spectacles.

In the type with spectacles, there are a method of coloring right and left images with different colors and viewing the images while wearing spectacles with the reversed right and left colors, and a method of shooting right and left images with filters polarized at right angles to each other and viewing the images while wearing spectacles with filters respectively polarized in the same direction, for example, and various methods have been developed and commercialized. However, the type with spectacles for binocular vision is not able to eliminate the vexatious complication of wearing spectacles, and therefore the type without the spectacles has been becoming mainstream recently.

In the display devices for a three-dimensional image in the direct-sight type without spectacles, light from a pixel has a direction controlled with an optical system such as a parallax barrier, a lenticular lens, or a microlens array (fly's-eye lens) to reflect different images respectively onto right end left eyes and obtain a stereognostic sense.

For example, Patent Document 1 below discloses a technique of using a parallax barrier to reflect an image for right eye and an image for left eye onto a right eye and a left eye respectively for displaying a three-dimensional image.

Patent Document 1: Japanese Patent Laid-Open 8-036145 (page 2, FIG. 1)

The technique for displaying a three-dimensional image, which is described in the Patent Document 1 above, will be described in detail with reference to FIGS. 15 and 16. FIGS. 15 and 16 are diagrams showing a positional relationship of a pixel of a liquid crystal panel 1401, a parallax barrier 1403 with an aperture 1402 in the shape of a slit, and both eyes of a viewer.

Of a plurality of pixels of the liquid crystal panel 1401, FIGS. 15 and 16 show only sections of a line of pixels in the direction along a line connecting the both eyes. The aperture 1402 has a longitudinal direction that corresponds to a direction vertical to the direction along the line connecting the both eyes in a plane parallel to the liquid crystal panel.

The parallax barrier 1403 is positioned between the viewer and the liquid crystal panel 1401. On the opposite side of the liquid crystal panel 1401 from the viewer, a light guiding plate 1404 is provided, and light emitted from a light source 1405 is made to travel in the light guiding plate 1404 and irradiated to the liquid crystal panel 1401.

Then, when a three-dimensional image is displayed as shown in FIG. 15, two adjacent pixels in the direction along the line connecting the both eyes, of the liquid crystal panel 1401, are differently used as a pixel for right eye and a pixel for left eye respectively. In the pixel for left eye, an image that is probably obtained as viewed from the left eye (image L) is displayed, and an image that is probably obtained as viewed from the right eye (image R) is displayed in the pixel for right eye.

Accordingly, a portion of light emitted from the light guiding plate 1404 is transmitted through each pixel of the liquid crystal panel, and then through the aperture 1402 of the parallax barrier 1403 to enter the both eyes of the viewer. On this occasion, when the relation of a pitch B of the aperture 1402, a pixel pitch P of the liquid crystal panel 1401, and a distance E between the both eyes is optimized, it is possible to make light from the pixel for right eye incident only into the right eye and to make light from the pixel for left eye only incident into the left eye. In the result, it is possible to make the viewer recognize a three-dimensional image formed of the image L and the image R.

In the case of displaying a two-dimensional image, without using adjacent pixels in the direction along the line connecting the both eyes differently as the pixel for right eye and the pixel for left eye respectively, the same image is displayed in the both pixels, as shown in FIG. 16. According to the configuration described above, the same image is reflected onto the both eyes, and it is possible to make the viewer recognize a two-dimensional image.

The method described in the Patent Document 1 has a defect that it is required to sacrifice a half of a screen resolution in displaying a two-dimensional image in order to display both of a two-dimensional image and a three-dimensional image. In a normal display device for displaying only a two-dimensional image, a corresponding image can be displayed with respective to each of all pixels. In the display device disclosed in the Patent Document 1, however, as understood from FIG. 16, images of all the pixels cannot be reflected on the both eyes unless the same image is displayed in the pixel for left eye and the pixel for right eye. If a corresponding image can be displayed with respective to each of all the pixels to ensure the resolution in displaying a two-dimensional image, images of all the pixels are not reflected on the both eyes to see a fuzzy image. Accordingly, when priority is placed on the image quality, a half of the resolution is forced to be necessarily sacrificed.

In general display devices, a two-dimensional image is crushingly frequently displayed more than a three-dimensional image, and it is not desirable to sacrifice a resolution of a two-dimensional image for providing a function of displaying a three-dimensional image.

Consequently, Non-Patent Document 1 discloses a technique for displaying a three-dimensional image, which is developed in order to avoid the defect.

Non-Patent Document 1: Naoki TANAKA, "LIQUID CRYSTAL DISPLAY FOR SELLING PC AND MOBILE PHONES MORE INEXPENSIVE", NIKKEI MICRO DEVICES (October 1st), JAPAN, Nikkei Business Publications, Inc., published on Oct. 1, 2002, No. 208, pp 91-96

The technique for displaying a three-dimensional image, which is described in the Non-Patent Document 1 above, will be described in detail with reference to FIGS. 17 and 18. FIGS. 17 and 18 are diagrams showing a positional relationship of a pixel of a liquid crystal panel 1601, a retardation film 1602, a liquid crystal for switching 1603, a polarizing plate 1606, and both eyes of a viewer.

Of a plurality of pixels of the liquid crystal panel 1601, FIGS. 17 and 18 show only sections of a line of pixels in the direction along a line connecting the both eyes, similarly to FIGS. 15 and 16.

In the retardation film 1602, two regions that have 90° different directions of polarization from each other are arranged in stripes, and each of the regions has a longitudinal direction that corresponds to a perpendicular direction to the direction along the line connecting the both eyes in a plane parallel to the liquid crystal panel 1601. In addition, the polarizing plate 1606 has a direction of polarization, which is mutually ±45° different from those of the two regions of the retardation film 1602.

On the opposite side of the liquid crystal panel 1601 from the viewer, the retardation film 1602, the liquid crystal for switching 1603, and the polarizing plate 1606 are provided and the retardation film 1602 is interposed between the liquid crystal panel 1601 and the liquid crystal for switching 1603. In addition, the polarizing plate 1606 is provided on the opposite side of the liquid crystal for switching 1603 from the retardation film 1602.

Further, a light guiding plate 1604 is provided on the further other side of the polarizing plate 1606 from the viewer. Light emitted from a light source 1605 is made to travel in the light guiding plate 1604 and irradiated to the polarizing plate 1606. The polarizing plate 1606 transmits predetermined polarized light of the irradiated light. The transmitted light is made incident into the liquid crystal for switching 1603.

The liquid crystal for switching 1603 can rotate a plane of polarization of transmitting light when the liquid crystal has an orientation controlled by voltage. When a three-dimensional image is displayed as shown in FIG. 17, a plane of polarization of transmitting light is rotated 45° in the liquid crystal for switching 1603. The light with the plane of polarization rotated 45° is transmitted through either of the two regions of the retardation film 1602.

In this way, the combination of the retardation film 1602, the liquid crystal for switching 1603, and the polarizing plate 1606 can function as a parallax barrier.

When the light transmitted through the retardation film 1602 is transmitted through the liquid crystal panel 1601, it is possible to make light from a pixel for right eye incident only into the right eye and to make light from a pixel for left eye only incident into the left eye. In the result, it is possible to make the viewer recognize a three-dimensional image formed of the image L and the image R.

In the case of displaying a two-dimensional image, the plane of polarization is not rotated in the liquid crystal for switching 1603. Therefore, approximately a half of light transmitted through the polarization plate is transmitted uniformly through the two regions of the retardation film 1602. The configuration described above makes it possible to reflect images of all the pixels onto the both eyes of the viewer, and a two-dimensional image can be recognized without sacrificing a half of the resolution unlike the Patent Document 1.

However, since it is required to provide the liquid crystal for switching in addition to the liquid crystal panel in the method described in the Non-Patent Document 1, the display device itself is bulky to hinder making a thin shape.

DISCLOSURE OF INVENTION

In view of the aforementioned problems, it is an object of the present invention to provide a display device that is able to display a three-dimensional image without reducing a resolution in displaying a two-dimensional image to the half, and prevent the device itself from being bulky.

In a display device according to the present invention, a light-emitting panel that uses a light-emitting element as a display element (hereinafter, referred to as a panel simply) is used instead of a liquid crystal panel to display images. Since the light-emitting element itself emits light, it is unnecessary to provide a light source unlike the case of using a liquid crystal panel. Therefore, it is unnecessary to use parts for a backlight such as a light source and a light guiding plate, which hinder a display device from being made into a thin shape. In addition, an electrode that has a property of transmitting light (translucency) is used as an anode and a cathode of the light-emitting element. In other words, light of the light-emitting element is emitted form both sides of the panel.

FIG. 1 simply shows a configuration of a display device according to the present invention. In FIG. 1(A), reference numeral 101 denotes a side view of a panel that has a light-emitting element sealed and a plurality of pixels for displaying images. In addition, reference numeral 102 denotes a means that enables to reflect different images respectively onto left and right eyes by controlling a traveling direction of light emitted from pixels, which is referred to as an optical system in the specification. One side of the panel is used for displaying a two-dimensional image while the other side is used for displaying a three-dimensional image.

When the optical system 102 is used, a three-dimensional image can be viewed as shown in FIG. 1(B) in the case of viewing from the direction shown by a dashed arrow. In addition, in the case of viewing from the direction shown by a solid arrow, a two-dimensional image can be seen on the side opposite to the side with a three-dimensional image displayed, as shown in FIG. 1(C).

In displaying images in one of the sides, a desired contrast can be kept when a means for shielding incident light into the other side (hereinafter, referred to as a shield means) 103 is provided.

It is not necessarily the case that the shield means 103 is formed separately from the panel 101, and the shield means 103 may be fabricated inside the panel. In addition, it is not necessarily the case that the shield means 103 is included as a component of a display device according to the present invention. In the case where emphasis is not necessarily on contrast, the shield means may not be provided. In an electronic device that uses a display device as one of parts, an object that can be used as a substitute for the shield means 103 may be provided to be used for keeping contrast.

Since the both sides of the panel are different from each other in scanning direction, at least a scanning direction in a horizontal direction is reversed in switching from a two-dimensional image to a three-dimensional image or from a three-dimensional image to a two-dimensional image.

Since a light-emitting device is used in the present invention, it is unnecessary to use parts such as a light source and a light guiding plate unlike a liquid crystal panel and it is possible to prevent the device itself from becoming bulky. Additionally, when the light-emitting device is used, a side for displaying a two-dimensional image and a side for displaying a three-dimensional image can be used differently with one panel. Therefore, since the optical system 102 is not provided between a viewer and the panel in displaying a two-dimensional image, images of all pixels can be reflected onto both eyes of the viewer, and a two-dimensional image can be recognized without sacrificing a half of the resolution unlike the Patent Document 1.

The panel may be any of an active matrix panel and a passive matrix panel.

BRIEF DESCRIPTION OF DRAWINGS

FIGS. 8(A) to 8(C) are diagrams showing switching of a scanning direction.

BEST MODE FOR CARRYING OUT THE INVENTION

Embodiment Mode 1

Figure 1A:
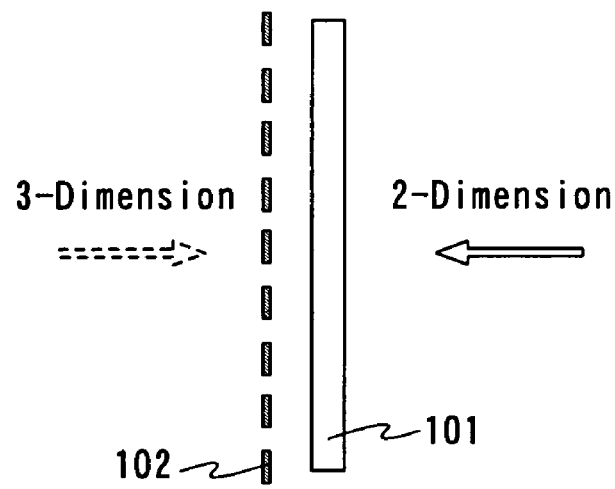
FIGS. 1(A) to 1(C) are diagrams showing a configuration of a display device according to the present invention.
Figure 1B:
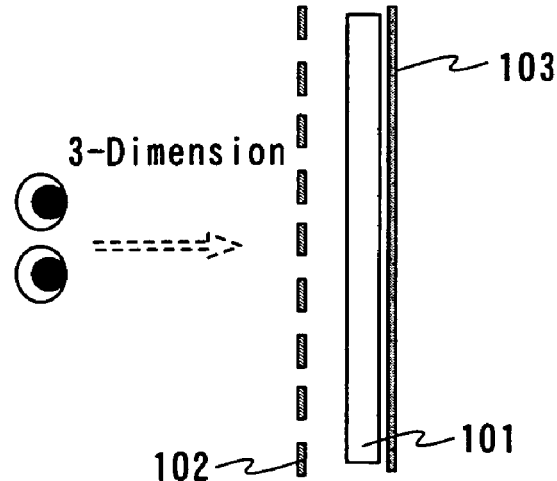
Figure 1C:
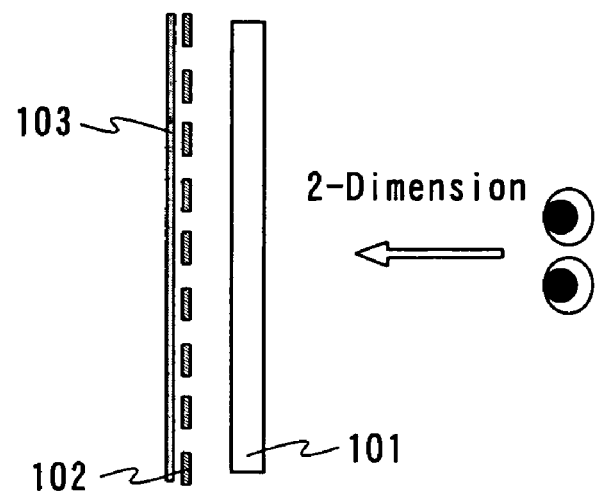
Figure 2A:
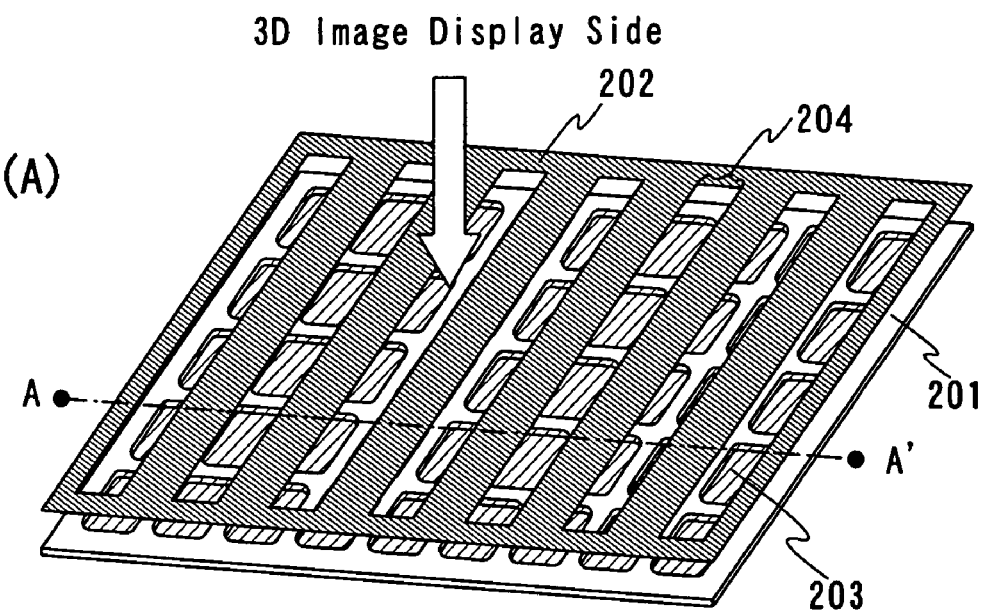
FIGS. 2(A) and 2(B) are perspective views of a display device according to the present invention.
Figure 2B:
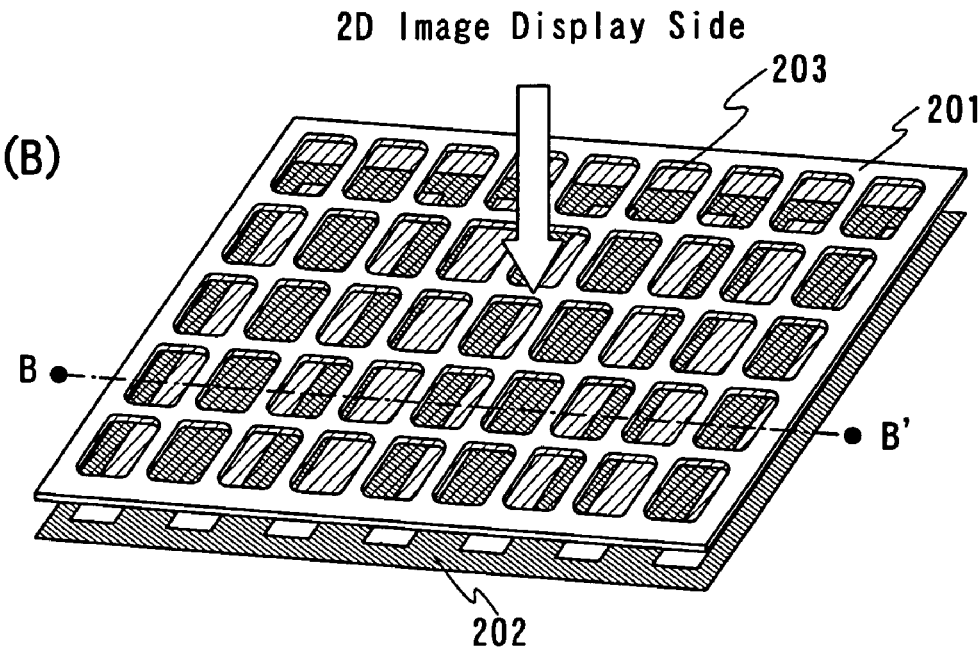

A configuration of a display device according to the present invention will be described in detail. FIG. 2(A) and FIG. 2(B) show a configuration of a display device according to the present invention. FIG. 2(A) is an appearance viewed from a side for displaying a three-dimensional image and FIG. 2(B) is an appearance viewed from a side for displaying a two-dimensional image. FIG. 2(A) and FIG. 2(B) are in a reverse relation. In FIG. 2(A), an arrow shows a direction of a sight line from a viewer to a panel in viewing a three-dimensional image. Further, in FIG. 2(B), an arrow shows a direction of a sight line from a viewer to a panel in viewing a two-dimensional image.

Reference numeral 201 denotes a panel that has a plurality of pixels 203 provided for displaying images, a light-emitting element is provided in each pixel 203. The light-emitting element of each pixel 203 uses an electrode that transmits light as anode and a cathode. Therefore, since light is transmitted in the case of providing no shield means, the other side of the panel 201 can be seen through in the pixel. Then, light emitted form the light-emitting element is emitted from the both sides of the panel 201. One side of the panel is used for displaying a two-dimensional image and the other side is used for displaying a three-dimensional image.

Further, reference numeral 202 denotes an optical system that is able to reflect different images respectively onto left and right eyes by controlling a traveling direction of light emitted from pixels. Although a parallax barrier is used in FIG. 2, the optical system is not limited to this. It is also possible to use another optical system such as a lenticular lens or a microlens array. The parallax barrier that is used in FIG. 2 as the optical system 202 has an aperture 204 in the shape of a slit.

The optical system is overlapped with one side of the panel 201 at a certain distance. The side overlapped with the optical system 202 corresponds to the side for displaying a three-dimensional image and the other side corresponds to the side for displaying a two-dimensional image. Consequently, the optical system 202 is positioned between a viewer and the panel 201 when the viewer views a three-dimensional image. On the contrary, the optical system 202 is positioned on the other side of the panel from a viewer when the viewer views a two-dimensional image.

Figure 3:
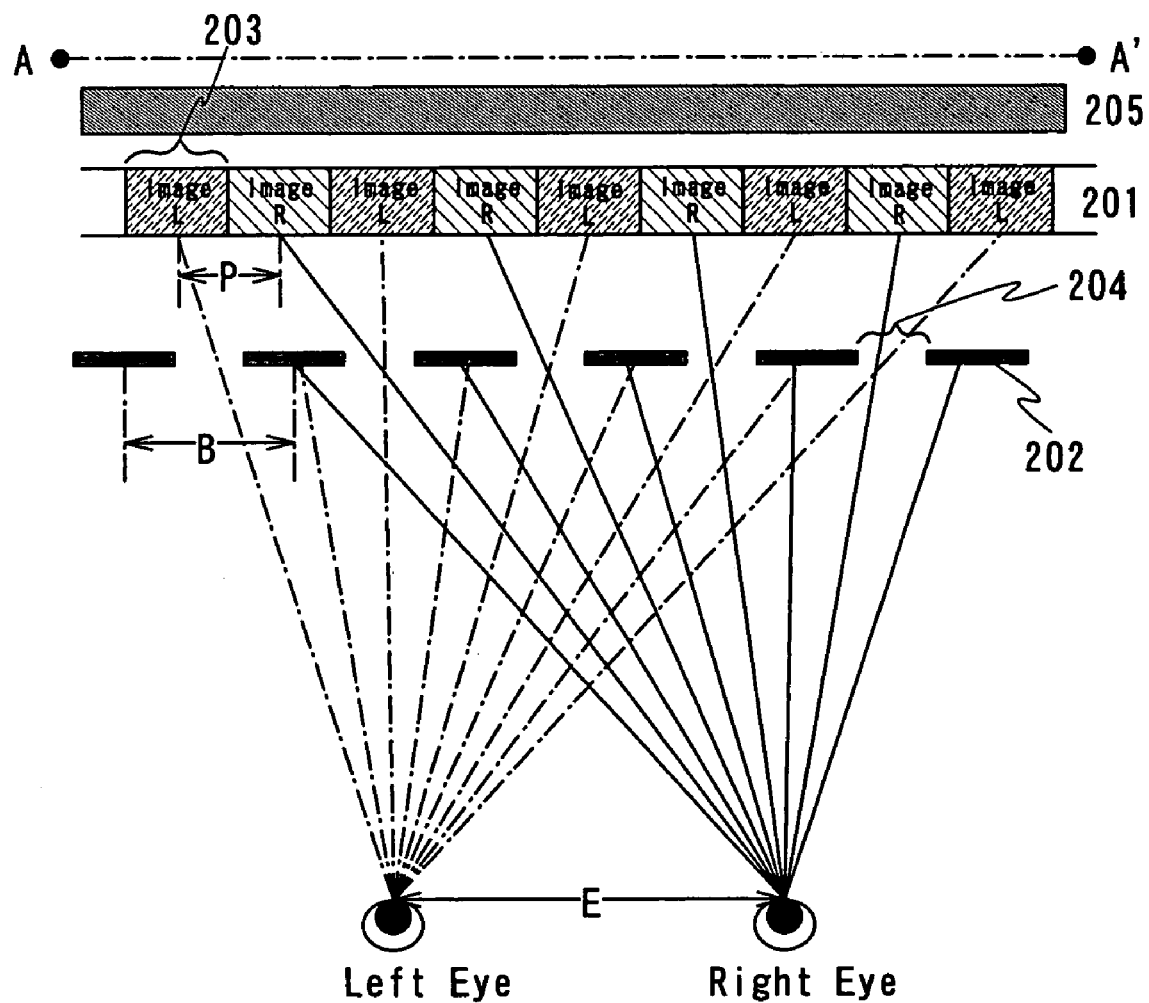
FIG. 3 is a diagram showing a positional relationship of a panel, an optical system, a shield means, and both eyes in displaying a three-dimensional image.

Next, an explanation will be given for a positional relationship of the pixel 203 of the panel 201, the optical system 202, and both eyes of a viewer in displaying a three-dimensional image. FIG. 3 shows a sectional view of FIG. 2(A) along A-A'. However, the A-A' corresponds to the direction along a line connecting the both eyes of the viewer.

Of a plurality of pixels of the panel 201, FIG. 3 shows a line of pixels 203 in the direction along the line connecting the both eyes. Further, the parallax barrier is used as the optical system 202 in the example shown in FIG. 3, and reference numeral 204 denotes an aperture provided for the parallax barrier 202. The aperture 204 has a longitudinal direction that corresponds to a direction vertical to the direction along the line connecting the both eyes in a plane parallel to the panel 201. The parallax barrier 202 is provided between the both eyes and the panel 201.

Then, when a three-dimensional image is displayed as shown in FIG. 3, two adjacent pixels in the direction along the line connecting the both eyes, of the panel 201, are differently used as a pixel for right eye and a pixel for left eye respectively. In the pixel for left eye, an image that is probably obtained as viewed from the left eye (image L) is displayed, and an image that is probably obtained as viewed from the right eye (image R) is displayed in the pixel for right eye.

Accordingly, a portion of light emitted from each pixel 203 of the panel 201 is transmitted through the aperture 204 of the parallax barrier 202 to enter the both eyes of the viewer. On this occasion, when the relation of a pitch B of the aperture 204, a pixel pitch P of the panel 201, and a distance E between the both eyes is optimized, it is possible to make light from the pixel for right eye incident only into the right eye and to make light from the pixel for left eye only incident into the left eye. In the result, it is possible to make the viewer recognize a three-dimensional image formed of the image L and the image R.

On this occasion, a shield means 205 for shielding light emitted from the panel may be provided on the further other side of the panel 201 from the viewer, which is not shown in FIG. 2. When the shield means 205 is provided, the panel 201 can have contrast enhanced. Further, when a shield means that can suppress reflection of light in addition to shielding light is used, it is possible to obtain images with further enhanced contrast.

Figure 4:
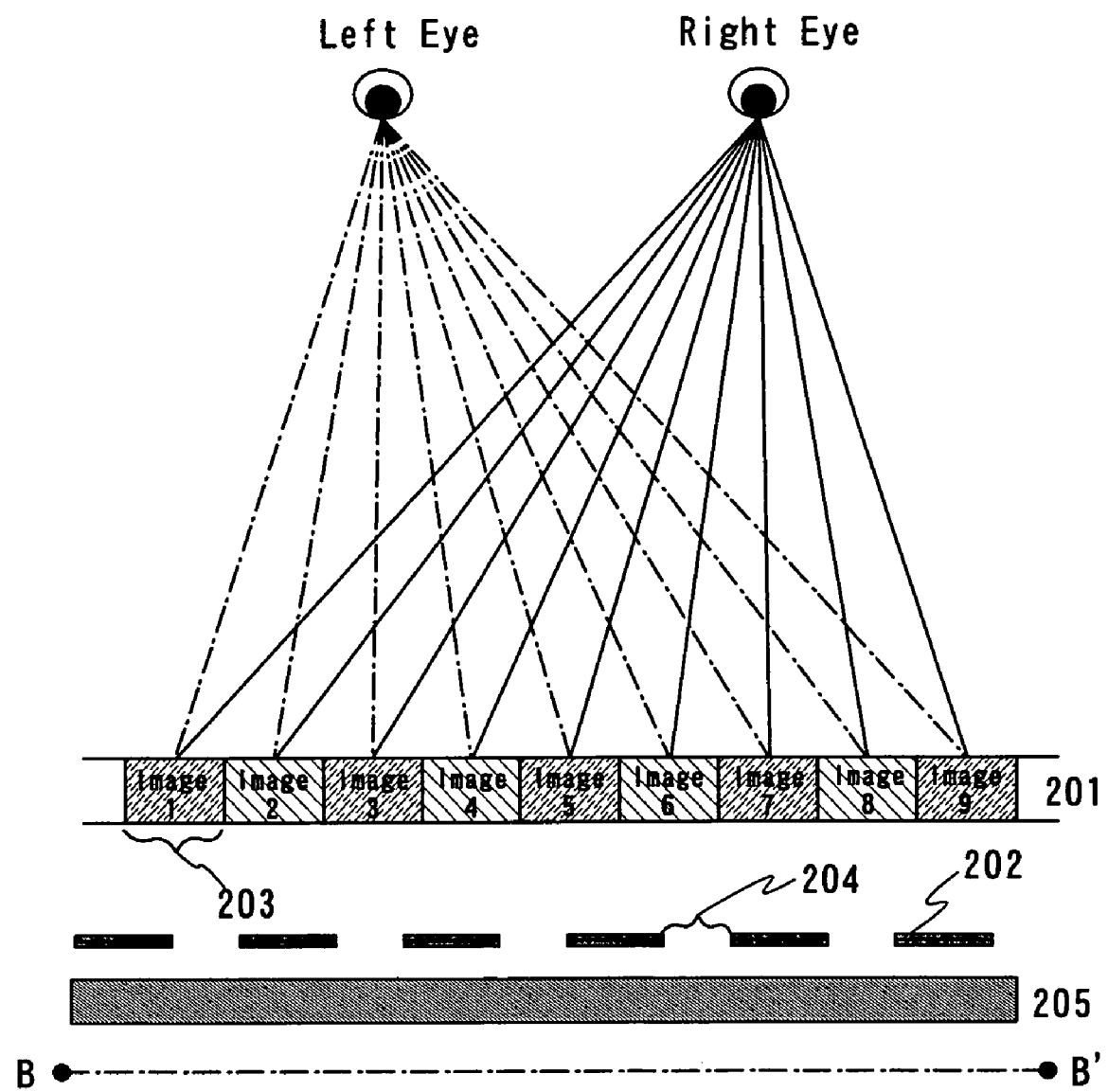
FIG. 4 is a diagram showing a positional relationship of a panel, an optical system, a shield means, and both eyes in displaying a two-dimensional image.

Next, an explanation will be given for a positional relationship of the pixel 203 of the panel 201, the optical system 202, and both eyes of a viewer in displaying a two-dimensional image. FIG. 4 shows a sectional view of FIG. 2(B) along B-B'. However, the B-B' corresponds to the direction along a line connecting the both eyes of the viewer. The same reference numerals are assigned to the portions already shown in FIG. 3.

In the case of displaying a two-dimensional image, the side opposite to the side for displaying a three-dimensional image is used in the panel 201. Therefore, no parallax barrier exists between both eyes of a viewer and the panel. In the case of displaying a two-dimensional image, without differently using adjacent pixels in the direction along the line connecting the both eyes as the pixel for right eye and the pixel for left eye respectively, corresponding images are displayed respectively in all the pixels. The configuration described above makes it possible to reflect the images of all the pixels onto the both eyes of the viewer, and a two-dimensional image can be recognized without sacrificing a half of the resolution unlike the Patent Document 1.

Also, when a two-dimensional image is displayed, the shield means 205 provided makes it possible to enhance contrast of the panel 201 as the case of displaying a three-dimensional image. In the case of using the shield means 205, which is not shown in FIG. 2, the shield means 205 is provided on the further other side of the panel 201 from the viewer. When the shield means 205 is provided, the panel 201 can have contrast enhanced. Further, when a shield means that can suppress reflection of light in addition to shielding light is used, it is possible to obtain images with further enhanced contrast.

The shield means 205 may be formed separately from the panel 201 or may be formed inside the panel. Alternatively, an object that exists separately from the display device and that is appropriate for shielding light may be used as a substitute for the shield means.

Embodiment Mode 2

Next, FIG. 5 is used to describe an example that an object existing separately from a display device is used as a substitute for a shield means.

Figure 5A:
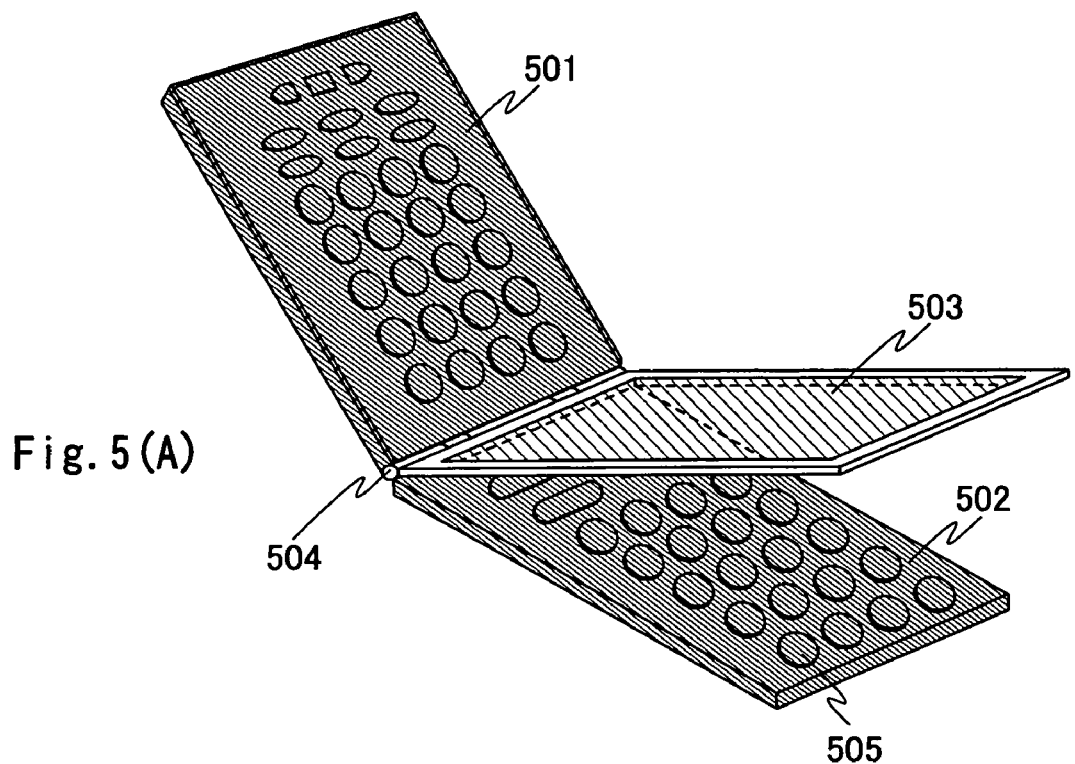
FIGS. 5(A) to 5(C) are diagrams showing an example of an electronic device that has a shield means.

FIG. 5 shows an electronic book corresponding to one mode of electronic devices using a display device according to the present invention, and FIG. 5(A) is a perspective view of the electronic book. The electronic book has two frame bodies 501 and 502 and a display device 503 according to the present invention, which are connected with a hinge 504, and can be turned with the hinge 504 as a center. The frame bodies 501 and 502 have various operation keys 505 provided.

The frame bodies 501 and 502 have, at the side of the display device 502, a side formed of a material that can shield light, and the side can be used as a shield means when it is desired to improve contrast of the display device 502.

Figure 5B:
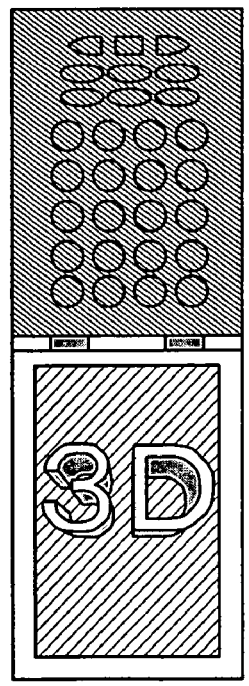
Figure 5C:
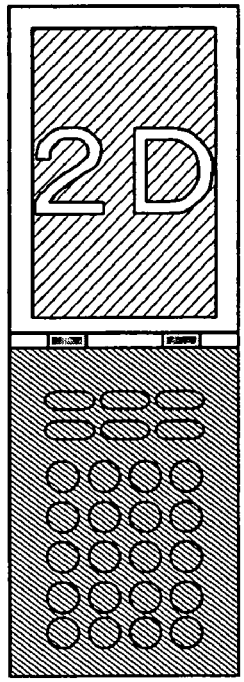

FIG. 5(B) shows a state of the electronic book shown in FIG. 5(A), in which the chassis 502 is overlapped with one side of the display device 503 to be used as a shield means and a three-dimensional image is displayed in the other side. In addition, FIG. 5(C) shows a state in which the chassis 501 is overlapped with the other side of the display device 503 to be used as a shield means and a three-dimensional image is displayed in the one side.

In this way, contrast can be improved without providing a shield means with the display device. Alternatively, without providing a shield means, the display device may be used with the other side daringly seen through.

In addition, switching of images in the display device 503 can be performed also automatically in accordance with angle θ formed by the display device and the chassis 501 or 502 at the hinge 504. FIG. 19 is used to describe an example of a structure of the hinge 504 in the case of switching images automatically in accordance with an angle formed by the chassis 501 and the display device 503.

FIG. 19 shows sectional views of the hinge 504 of the electronic book in the present embodiment. The display device 503 is connected to a rotation axis 508 in the hinge 504. The rotation axis 508 has a section shaped like a circle with a portion dropped off.

Further, the chassis 501 and 502 is connected to a rotating part 506 at the hinge 504. The rotating part 506 can be rotated with the rotation axis 508 as a main spindle, and the angle θ formed by the chassis 501 and the display device 503 is determined by an angle of rotation of the rotating part 506.

The rotating part 506 has a button 507 provided for recognizing the angle θ formed by the chassis 501 and the display device 503. The angle θ can be recognized depending on whether or not the button 507 has contact with a portion of a circular arc of the rotation axis 508.

Figure 19A:
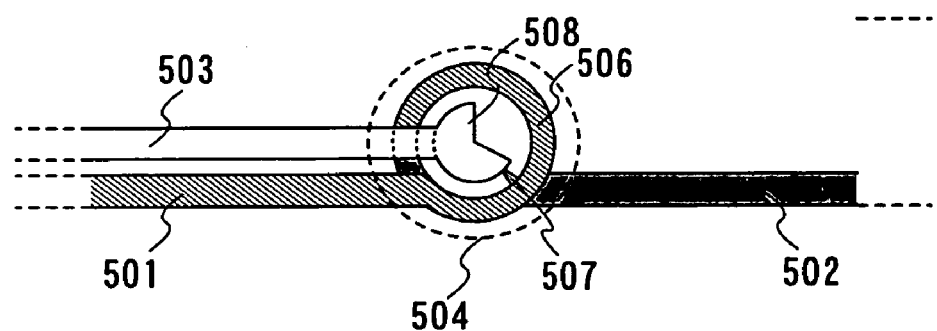
FIGS. 19(A) and 19(B) are diagrams showing a structure of a hinge.
Figure 19B:
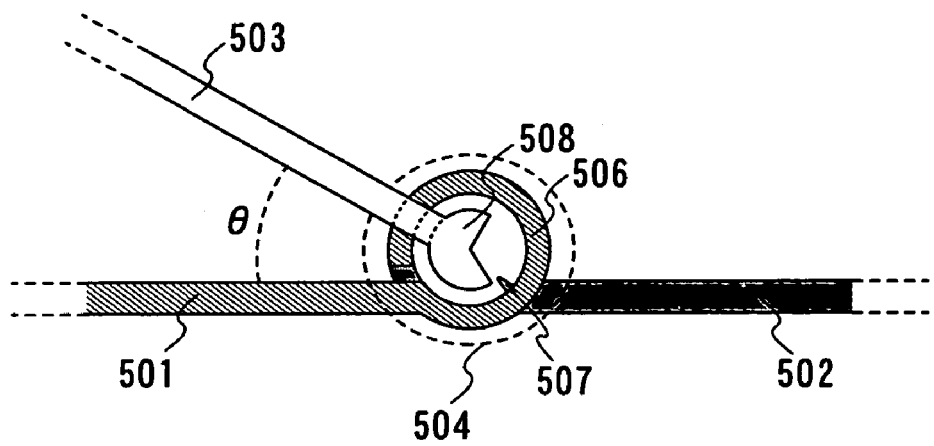

FIG. 19(A) and FIG. 19(B) show the sectional views of the hinge 504 respectively in the case of θ=0° and θ=30°. In the case of θ=0° in FIG. 19(A), the rotation axis 508 has contact with the button 507. In the case of θ=30° in FIG. 19(B), the button 507 is kept away from the rotation axis 508.

Depending on whether or not the button 507 has contact with the rotation axis 508, images are switched. The structure described above makes it possible to switch displayed images automatically in accordance with the angle θ formed by the chassis 501 and the display device 503 at the connection portion. It is possible for a designer to set appropriately a specific value of the angle θ at which images are switched by changing the shape of the rotation axis 508.

Embodiment Mode 3

Next, FIG. 6 is used to describe an example that a shield means is fabricated in a panel.

Figure 6A:
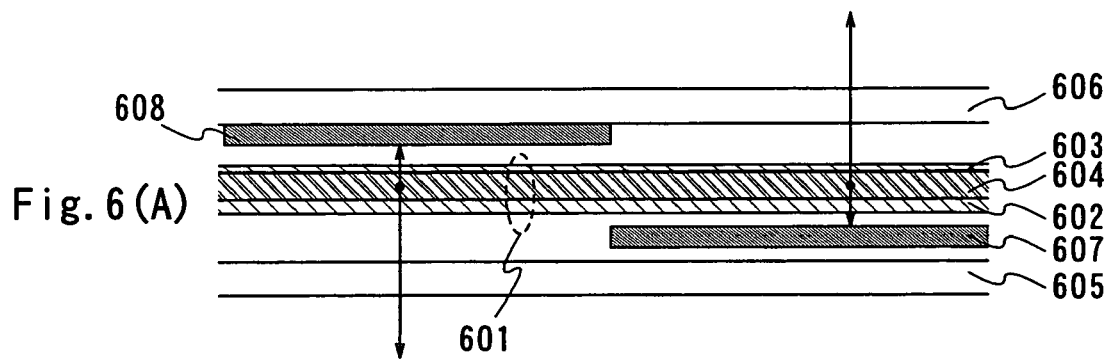
FIGS. 6(A) to 6(C) are diagrams showing a structure of a panel that has a shield means.

FIG. 6(A) shows one mode of a sectional view of a panel. The sectional view shown in FIG. 6(A) simply shows a positional relationship of a light-emitting element, a substrate, and a shield film. In practice, in addition to these, a component such as an insulating film, a conductive film, a wiring, a transistor, or a capacitor, tailored to the panel specification, is provided, which are however omitted in FIG. 6(A).

In FIG. 6(A), a light-emitting element 601 is formed of an anode 602, a cathode 603, and an electroluminescent layer 604 provided between the anode 602 and the cathode 603. In the present invention, the anode 602 and the cathode 603 are both formed of a translucent electrode. The light-emitting element 601 is sealed between two transparent substrates 605 and 606.

In addition, a shield film 607 corresponding to a shield means is formed between the substrate 605 and the anode 602 and a shield film 608 corresponding to a shield means is formed also between the substrate 606 and the cathode 603. The shield film 607 shields light emitted from a half of a region of a light-emitting element provided in a pixel while the shield film 608 shields light emitted from the other half of the region.

Although the shield films 607 and 608 are sandwiched between the substrates 605 and 606 in the example shown in FIG. 6, the present invention is not limited to this structure. One or both of the shield films 607 and 608 may be provided on one or both of the opposite sides of the substrates 605 and 606 from the light-emitting element provided. However, when the shield film is provided in a position that is closer to the light-emitting element, transmission of light can be suppressed more certainly.

The structure described above makes it possible to suppress an amount of light transmitted through the panel and enhance contrast.

Although the two shield films 607 and 608 respectively shield the half regions of the light-emitting element in the structure shown in FIG. 6, the present invention is not limited to this. In the case of using an optical system for shielding light such as a parallax barrier, for example, a three-dimensional image has a lower luminance than a two-dimensional image. In this case, a balance between areas of shield films may be adjusted so as to emit more light to a side where a three-dimensional image is displayed, thereby to balancing the both in luminance.

In the case of the structure shown in FIG. 6(A), since it is only necessary to provide the two shield films described above for a pixel of a normal panel, the structure described above can be implemented without changing a design of a mask considerably. In addition, the structure can be applied to both of a passive matrix display device and an active matrix display device. In the case of applying the structure to an active matrix display device, lowering of resolution can be prevented since it is unnecessary in each pixel to change either the number of transistors or a layout.

Figure 6B:
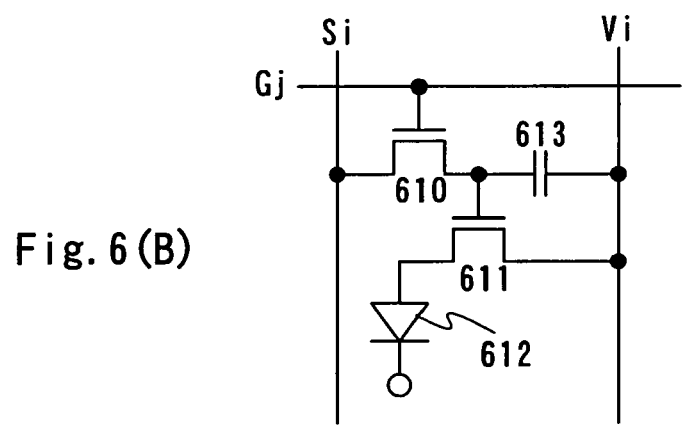
Figure 6C:
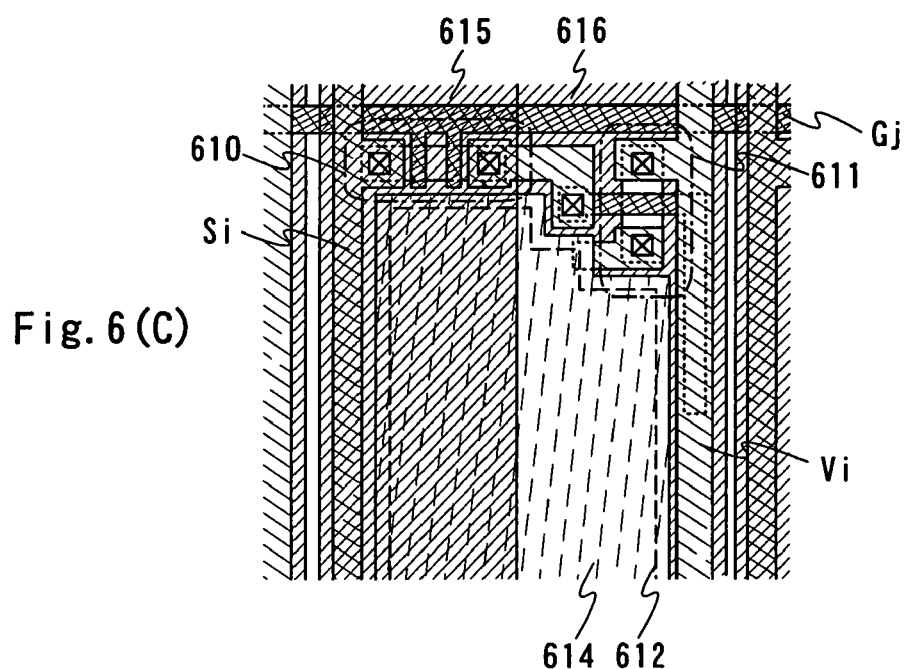

FIG. 6(B) shows a circuit diagram of a pixel that is used in a normal panel. FIG. 6(C) shows an example of a top view of the pixel in the case of providing a shielding film for the pixel shown in FIG. 6(B).

In FIG. 6(B), a transistor 610 has a gate connected to a scan line Gj (j=1 to y). The transistor 610 has a source and a drain, one connected to a signal line Si (i=1 to x) and the other connected to a gate of a transistor 611. The transistor 611 has a source and a drain, one connected to a power source line Vi (i=1 to x) and the other connected to a pixel electrode of a light-emitting element 612.

The light-emitting element 612 comprises an anode, a cathode, an electroluminescent layer provided between the anode and the cathode. In the case of connecting the anode to the source or the drain of the transistor 611, the anode serves as the pixel electrode and the cathode serves as an opposing electrode. On the contrary, in the case of connecting the cathode to the source or the drain of the transistor 611, the cathode serves as the pixel electrode and the anode serves as an opposing electrode. In the present invention, the both of the anode and the cathode are formed of an electrode through which light is transmitted.

A voltage is applied from a power source to each of the opposing electrode of the light-emitting element 612 and the power source line Vi. The difference in voltage between the opposing electrode and the power source line is kept at a value so that a voltage of forward bias is applied to the light-emitting element when the transistor 611 is turned on.

A storage capacitor 613 has two electrodes, one connected to the power source line Vi and the other connected to the gate of the transistor 611. The storage capacitor 613 is provided for keeping a gate voltage of the transistor 611 with the transistor 610 in a non-selected state (off-state). Although FIG. 6 shows the structure with the storage capacitor 613 provided, the present invention is not limited to this structure, and a structure without the storage capacitor 613 provided may be employed.

When the transistor 610 is turned on in accordance with an electric potential of the scan line Gj, an electric potential of a video signal input to the signal line Si to the gate of the transistor 611. The electric potential of the input video signal determines the gate voltage (difference in voltage between the gate and the source) of the transistor 611. Then, a drain current of the transistor 611, which flows in accordance with the gate electrode, is supplied to the light-emitting element 612 that emits light in accordance with the supplied current.

In FIG. 6(C), reference numeral 614 denotes the pixel electrode, and a region surrounded by a dashed line in the pixel electrode 614 is a region where the electroluminescent layer (not shown in the figure), the pixel electrode 614, and the cathode (not shown in the figure) are overlapped with each other, which corresponds to the light-emitting element 612.

Reference numerals 615 and 616 denote shielding films, and the shielding film 615 is provided over the light-emitting element 612 while the shielding film 616 is provided below the light-emitting element. The shielding film 615 shields a half of the region from which light emission of the light-emitting element is obtained while the shielding film 616 shields the other half of the region.

Figure 23:
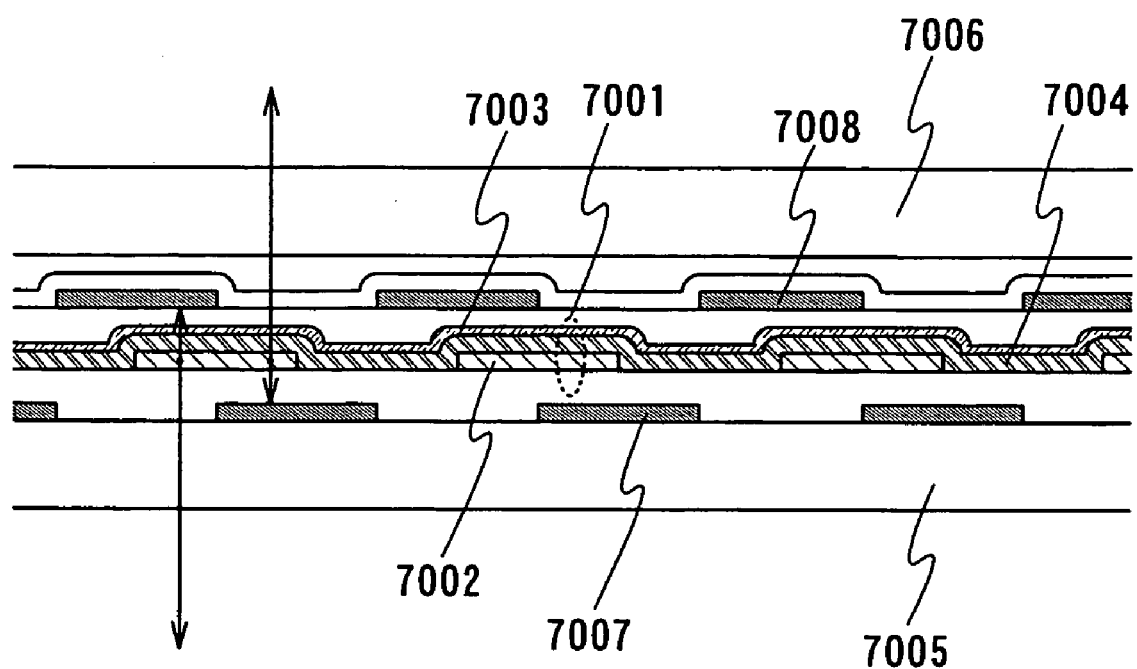
FIG. 23 is a sectional view of a display device according to the present invention, which uses a passive matrix light-emitting device.

Besides, FIG. 23 shows one mode of a sectional view of a passive matrix panel.

In FIG. 23, a light-emitting element 7001 is formed of an anode 7002, a cathode 7003, and an electroluminescent layer 7004 provided between the anode 7002 and the cathode 7003. The light-emitting element 7001 corresponds to a portion where the anode 7002, the electroluminescent layer 7004, and the cathode 7003 are overlapped with each other. The anode 7002 and the cathode 7003 are both formed of a translucent electrode. The light-emitting element 7001 is sealed between two translucent substrates 7005 and 7006.

In addition, a shielding film 7007 corresponding to a shield means is formed between the substrate 7005 and the anode 7002 and a shielding film 7008 corresponding to a shield means is formed also between the substrate 7006 and the cathode 7003. The shielding film 7007 shields light emitted from a half of a region of a light-emitting element provided in a pixel while the shielding film 7008 shields light emitted from the other half of the region.

Although the shielding films 7007 and 7008 are sandwiched between the substrates 7005 and 7006 in the example shown in FIG. 6, the present invention is not limited to this structure. One or both of the shielding films 7007 and 7008 may be provided on one or both of the opposite sides of the substrates 7005 and 7006 from the light-emitting element provided. However, when the shielding film is provided in a position that is closer to the light-emitting element, transmission of light can be suppressed more certainly.

The structure described above makes it possible to suppress an amount of light transmitted through the panel and enhance contrast.

Although the two shielding films 7007 and 7008 respectively shield the half regions of the light-emitting element in the structure shown in FIG. 23, the present invention is not limited to this. In the case of using an optical system for shielding light such as a parallax barrier, for example, a three-dimensional image has a lower luminance than a two-dimensional image. In this case, a balance between areas of shielding films may be adjusted so as to emit more light to a side where a three-dimensional image is displayed, thereby balancing the both in luminance.

Next, FIG. 7 is used to describe another example that a shield means is fabricated in a panel.

Figure 7A:
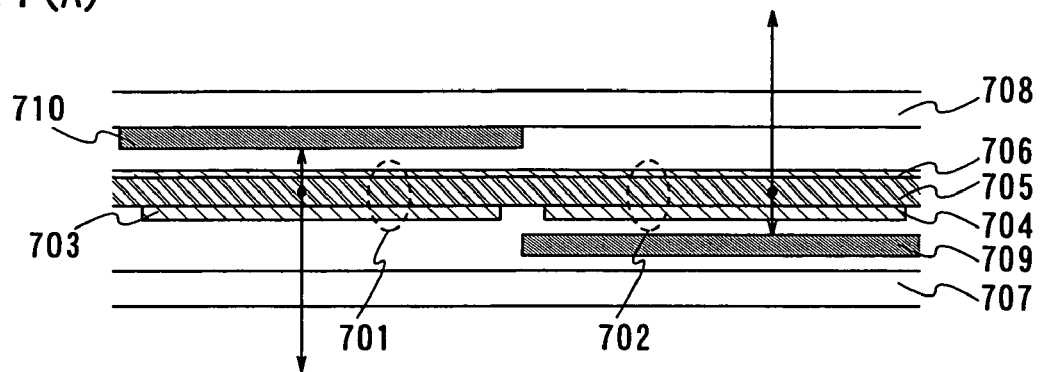
FIGS. 7(A) and 7(B) are diagrams showing a structure of a panel that has a shield means.

FIG. 7(A) shows one mode of a sectional view of a panel. The sectional view shown in FIG. 7(A) simply shows, like the case of FIG. 6(A), a positional relationship of a light-emitting element, a substrate, and a shielding film. In practice, in addition to these, a component such as an insulating film, a conductive film, a wiring, a transistor, or a capacitor, tailored to the panel specification, is provided, which are however omitted in FIG. 7(A).

Concerning a pixel shown in FIG. 7(A), two light-emitting elements 701 and 702 are provided in one pixel. The light-emitting element 701 has an anode 703 while the light-emitting element 702 has an anode 704. In addition, the two light-emitting elements 701 and 702 share an electroluminescent layer 705 and a cathode 706, and the electroluminescent layer 705 is provided between the anode 703 and the cathode 706 while the electroluminescent layer 705 is also provided between the anode 704 and the cathode 706.

It is not always necessary to share the electroluminescent layer and the cathode. In FIG. 7(A), the two light-emitting elements respectively have the anodes separately. However, the light-emitting elements may have an anode in common and respectively have cathodes separately.

The anodes 703 and 704 and the cathode 706 are all formed of a translucent electrode. Further, the light-emitting elements 701 and 702 are sealed between two translucent substrates 707 and 708.

In addition, a shielding film 709 corresponding to a shield means is formed between the substrate 707 and the anode 704 and a shielding film 710 corresponding to a shield means is formed also between the substrate 708 and the cathode 706. The shielding film 709 shields light emitted from the light-emitting element 702 toward the substrate 707 while the shielding film 710 shields light emitted from the light-emitting element 701 toward the substrate 708.

Also in FIG. 7, like the case of FIG. 6, one or both of the shielding films 709 and 710 may be provided on one or both of the opposite sides of the substrates 707 and 708 from the light-emitting elements provided. However, when the shielding film is provided in a position that is closer to the light-emitting elements, transmission of light can be suppressed more certainly.

The structure described above makes it possible to suppress an amount of light transmitted through the panel and enhance contrast.

In FIG. 7(A), the two shielding films may respectively have an area balance adjusted or the two light-emitting elements may have a luminance balance adjusted or an area balance adjusted, for example, thereby improving a luminance between tree-dimensional images and a two-dimensional image.

Figure 7B:
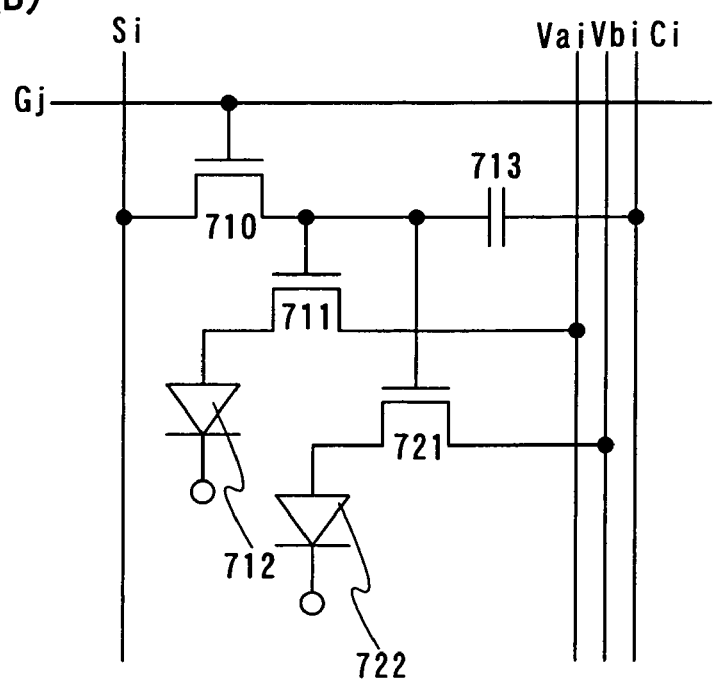

FIG. 7(B) shows a circuit diagram of a pixel that has the structure shown in FIG. 7A as an example.

In FIG. 7(B), a transistor 710 has a gate connected to a scan line Gj (j=1 to y). The transistor 710 has a source and a drain, one connected to a signal line Si (i=1 to x) and the other connected to gates of transistors 711 and 721. The transistor 711 has a source and a drain, one connected to a power source line Vai (i=1 to x) and the other connected to a pixel electrode of a light-emitting element 712. The transistor 721 has a source and a drain, one connected to a power source line Vbi (i=1 to x) and the other connected to a pixel electrode of a light-emitting element 722.

Each of the light-emitting elements 712 and 722 comprises an anode, a cathode, an electroluminescent layer provided between the anode and the cathode. In the case of connecting the anode to the source or the drain of the transistor 711 or 721, the anode serves as the pixel electrode and the cathode serves as an opposing electrode. On the contrary, in the case of connecting the cathode to the source or the drain of the transistor 711 or 721, the cathode serves as the pixel electrode and the anode serves as an opposing electrode. In the present invention, the both of the anode and the cathode are formed of an electrode through which light is transmitted. In FIG. 7(B), the light-emitting elements 712 and 722 respectively have the anodes provided separately, which are used as the pixel electrodes.

A voltage is applied from a power source to each of the opposing electrode of the light-emitting element 712 and the power source lines Vai and Vbi. The difference in voltage between the opposing electrode and the power source line is kept at a value so that a voltage of forward bias is applied to only one of the light-emitting elements 712 and 722 when the transistor 711 and 721 are turned on. The light-emitting element to which the voltage of forward bias is applied is determined according to whether images to be displayed are tow-dimensional or three-dimensional.

A storage capacitor 713 has two electrodes, one connected to a power source line for capacitor Ci (i=1 to x) and the other connected to the gates of the transistors 711 and 721. The storage capacitor 713 is provided for keeping gate voltages of the transistors 711 and 721 with the transistor 710 in a non-selected state (off-state). Although FIG. 7(B) shows the structure with the storage capacitor 713 provided, the present invention is not limited to this structure, and a structure without the storage capacitor 713 provided may be employed.

When the transistor 710 is turned on in accordance with an electric potential of the scan line Gj, an electric potential of a video signal input to the signal line Si to the gates of the transistors 711 and 721. The electric potential of the input video signal determines the gate voltage (difference in voltage between the gate and the source) of each of the transistors 711 and 721. Then, in accordance with the gate voltage, a drain current of either the transistor 711 or 721 is supplied to the corresponding light-emitting element 712 or 722, and therefore either the light-emitting element 712 or 722 emits light in accordance with the supplied current while the other is turned off.

In this way, a panel can have power consumption suppressed more than the panel shown in FIG. 6 by using only one of two light-emitting elements of a pixel. In addition, it is possible to prevent light from being emitted from a side of the panel, which is not used for displaying, and to prevent information on displayed images from being leaked to a third party from the side that is not used for displaying.

As the transistors that is used in the display devices according to the present invention, a transistor formed with the use of single-crystal silicon may be employed, or a thin film transistor that uses polycrystalline silicon, microcrystalline silicon (semi-amorphous silicon), or amorphous silicon may be employed. Alternatively, a transistor that uses an organic semiconductor may be employed.

The electroluminescent layer is a layer including an electroluminescent material from which luminescence generated by applying an electric field between the anode and the cathode (Electroluminescence) is obtained, and comprises a single layer or a plurality of layers. The luminescence in the electroluminescent layer includes light emission in returning from a singlet excited state to a ground state (fluorescence) and light emission in returning from a triplet excited state to a ground state (phosphorescence).

The light-emitting element can also have a form in which each of layers included in the electroluminescent layer such as a hole injection layer, an electron injection layer, a hole transport layer, and an electron transport layer is formed of an inorganic compound by itself or a material in which an inorganic compound is mixed into an organic compound. Further, these layers may be mixed partly with each other.

The light-emitting element in the present invention is an element that has a luminance controlled by current or voltage and that can emit light from both sides of a panel, and therefore includes an MIM type electron source element (electron emission element) that is used for an FED (Field Emission Display) and an OLED (Organic Light Emitting Diode).

Embodiment Mode 4

Next, an explanation will be given for switching of a scanning direction and a video signal in switching from a two-dimensional image to a three-dimensional image or from a three-dimensional image to a two-dimensional image.

In general, in a panel that has a plurality of pixels arranged in a matrix shape, a line of pixels are selected and video signals are input. A driving method of inputting video signals in sequence into the selected line of pixels is referred to as dot-sequential driving. In addition, a driving method of inputting video signals at once into all of the line of pixels is referred to as line-sequential driving. In any driving method, a video signal to be input to each pixel always has image information corresponding to the pixel.

FIG. 8(A) shows a panel that has a plurality of pixels provided in a matrix shape and image information (D1 to D35) input to each pixel. It is assumed that the panel shown in FIG. 8(A) is driven by dot-sequential driving, and a solid arrow shows a direction of selecting rows as a row-scanning direction and a dashed arrow shows an order of the pixels to which video signals are input as a row-scanning direction.

FIG. 8(B) shows an aspect in viewing the panel shown in FIG. 8(A) from the other side. The other side has a column-scanning direction headed in the reverse direction from left to right as shown in FIG. 8(B) while the column-scanning direction is headed from right to left in FIG. 8(A). Consequently, the order of inputting video signals is reverse in a row of pixels.

Therefore, in switching from a two-dimensional image to a three-dimensional image or from a three-dimensional image to a two-dimensional image, it is necessary to take either means of switching the column-scanning direction to the reverse or changing image information of video signals in accordance with the column-scanning direction to flip horizontal.

In switching from a two-dimensional image to a three-dimensional image or from a three-dimensional image to a two-dimensional image, since it is often the case that image information of video signals is changed, the image information may be changed additionally to flip horizontal. The configuration described above can make a driver circuit have a simpler structure.

In the case of switching the column-scanning direction to the reverse, a controller for processing video signals can have a structure more simplified in accordance with the scanning direction of the panel, and a burden of the controller in driving can be reduced more.

In order to view the other side of the panel, for example, it is assumed that the panel is reversed in the column direction. On this occasion, as shown in FIG. 8(C), the other side has a row-scanning direction is headed in the direction opposite to FIG. 8(A). Consequently, the order of inputting video signals is reverse in a row of pixels. In this case also, as the case of FIG. 8(B), it is necessary to take either means of switching the row-scanning direction to the reverse or changing image information of video signals in accordance with the row-scanning direction to flip vertical.

Next, FIG. 9 is used to describe a direction of reversing a display device according to the present invention, which is incorporated into an electronic device. FIG. 9 shows a configuration of a desktop monitor that is one of electronic devices that use a display device according to the present invention.

Figure 9A:
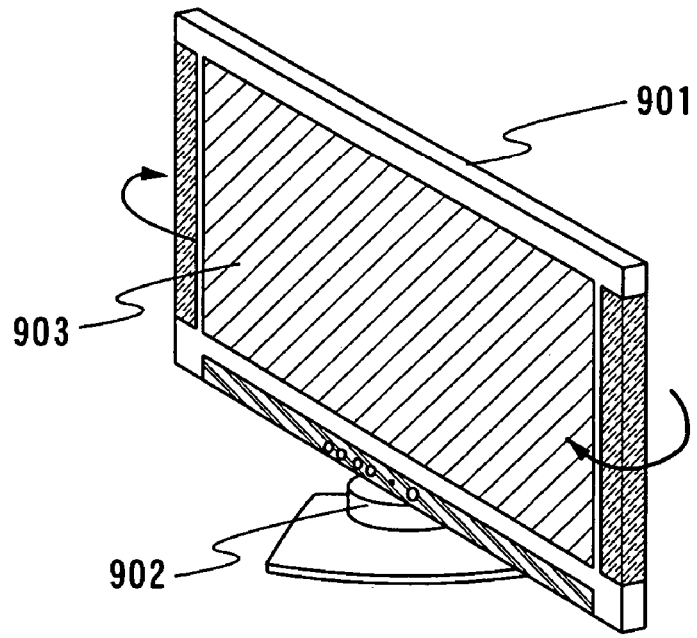
FIGS. 9(A) and 9(B) are diagrams of an electronic device that is able to reverse a display device.

A desktop monitor shown in FIG. 9(A) has a frame body 901, a support 902, and a display portion 903, and a display device according to the present invention is used for the display portion 903. The display portion 903 is provided also on the reverse side of the frame body 901, and the display portion 903 provided on the reverse side of the frame body 901 can be viewed without movement of a user by rotating the frame body 901 in a row direction of the display device as shown by an arrow.

In this case, in the display device, it is necessary to take either means of switching the column-scanning direction to the reverse or changing image information of video signals in accordance with the column-scanning direction to flip horizontal.

Figure 9B:
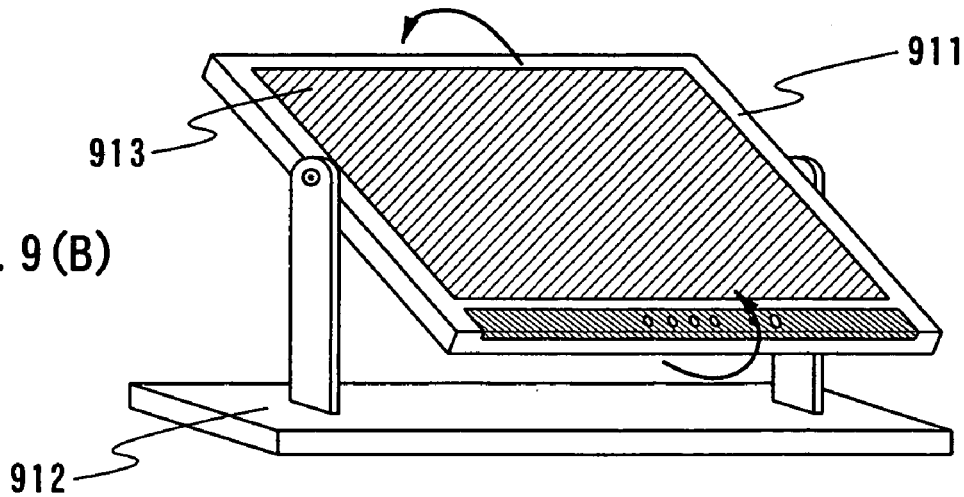

A desktop monitor shown in FIG. 9(B) has a frame body 911, a support 912, and a display portion 913, and a display device according to the present invention is used for the display portion 913. The display portion 913 is provided also on the reverse side of the frame body 911, and the display portion 913 provided on the reverse side of the frame body 911 can be viewed without movement of a user by rotating the frame body 911 in a column direction of the display device as shown by an arrow.

In this case, it is necessary to take either means of switching the column-scanning or row-scanning direction to the reverse or changing image information of video signals in accordance with the column-scanning or column-scanning direction to flip horizontal or flip vertical.

The case of dot-sequential driving is described in the present embodiment mode. However, a scanning direction may be switched or image information of video signals may be reversed to flip horizontal or flip vertical in a similar way also in the case of line-sequential driving in switching between a two dimension and a three dimension.

It is possible to use a display device according to the present invention for all monitors for displaying information such as a personal computer, a receiver of TV broadcasting, and an advertising display in addition to desktop monitors.

Embodiments

Hereinafter, embodiments of the present invention will be described.

Embodiment 1

In the present embodiment, of optical systems for controlling a traveling direction of light from a pixel, structures of a lenticular lens and a microlens array (fly's-eye lens) will be described.

Figure 10A:
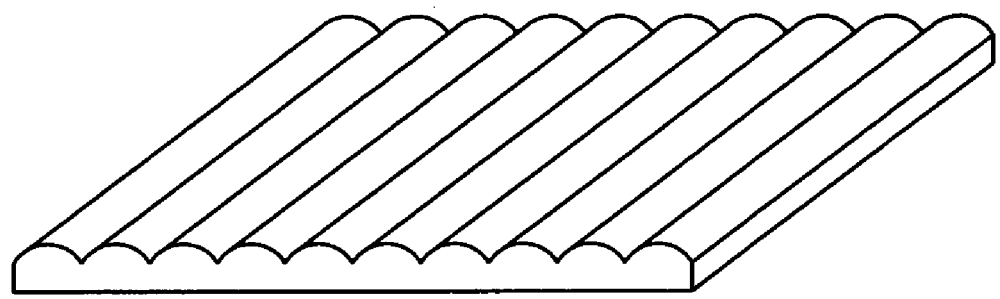
FIGS. 10(A) and 10(B) are perspective views of a lenticular lens and microlens array.
Figure 11:
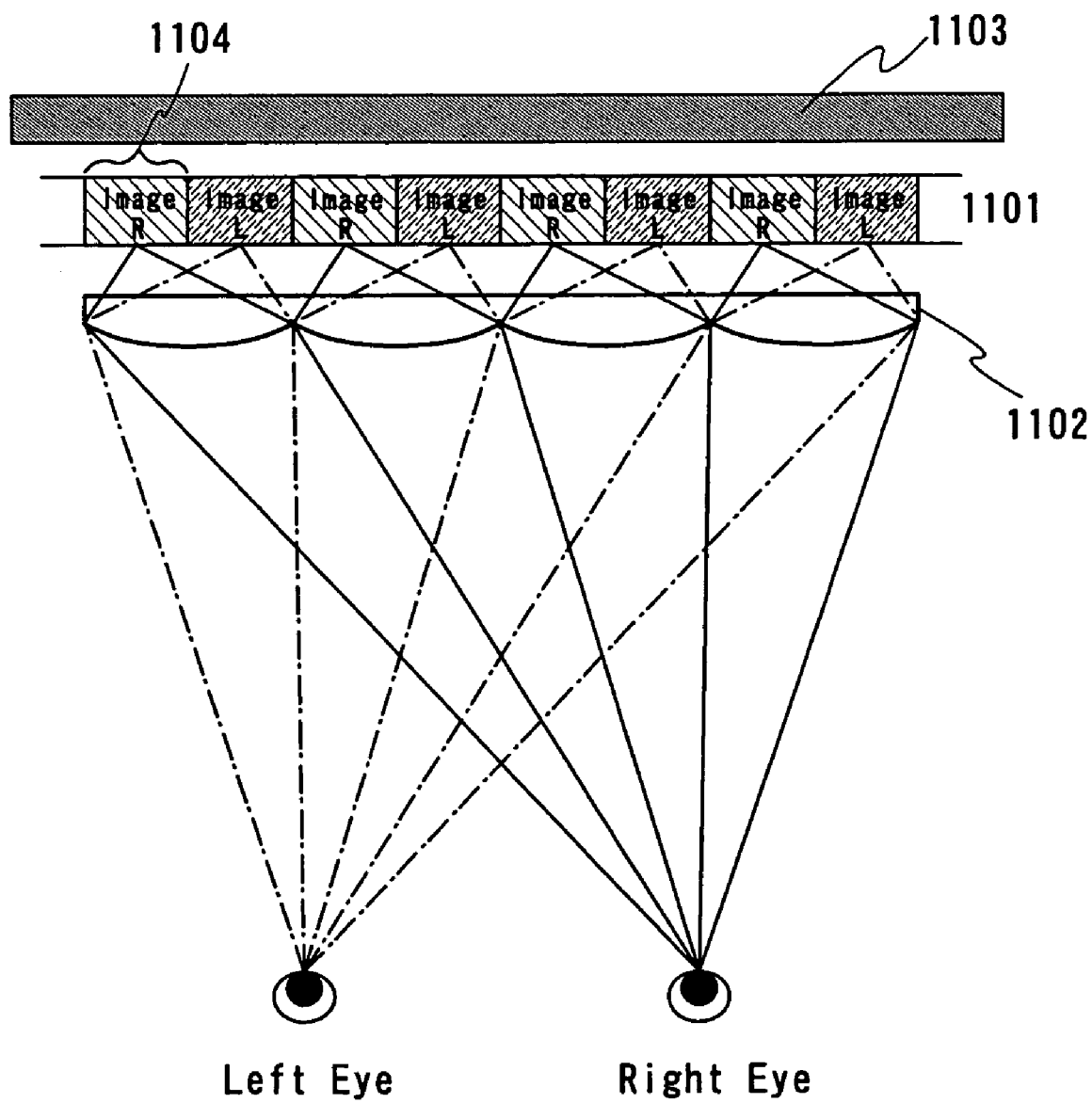
FIG. 11 is a diagram showing a positional relationship of a lenticular lens, a panel, a shield means, and both eyes in displaying a three-dimensional image.

FIG. 10(A) shows a perspective view of a lenticular lens. The lenticular lens has a shape like a plurality of hog-backed lenses connected, and light is condensed at a convex portion in the shape of a half circle to control a traveling direction thereof. FIG. 11 shows a sectional view of a display device according to the present invention, which uses a lenticular lens.

Of a plurality of pixels of a panel 1101, FIG. 11 shows a line of pixels 1104 in the direction along a line connecting both eyes. In addition, reference numeral 1102 denotes a lenticular lens, and hog-backed convex portions have a longitudinal direction that corresponds to a direction vertical to the direction along the line connecting the both eyes in a plane parallel to the panel 1101. The lenticular lens 1102 is provided between the viewer's both eyes and the panel 1101.

Then, when a three-dimensional image is displayed as shown in FIG. 11, two adjacent pixels in the direction along the line connecting the both eyes, of the panel 1101, are differently used as a pixel for right eye and a pixel for left eye respectively. In the pixel for left eye, an image that is probably obtained as viewed from the left eye (image L) is displayed, and an image that is probably obtained as viewed from the right eye (image R) is displayed in the pixel for right eye.

A portion of light emitted from each pixel 1104 of the panel 1101 is condensed by the lenticular lens 1102 to enter the both eyes of the viewer. On this occasion, when the lenticular lens 1102 has a focal depth optimized, it is possible to make light from the pixel for right eye incident only into the right eye and light from the pixel for left eye only incident into the left eye. In the result, it is possible to make the viewer recognize a three-dimensional image formed of the image L and the image R.

On this occasion, a shield means 1103 for shielding light emitted from the panel may be provided on the further other side of the panel 1101 from the viewer. When the shield means 1103 is provided, the panel 1101 can have contrast enhanced. Further, when a shield means that can suppress reflection of light in addition to shielding light is used, it is possible to obtain images with further enhanced contrast.

Figure 10B:
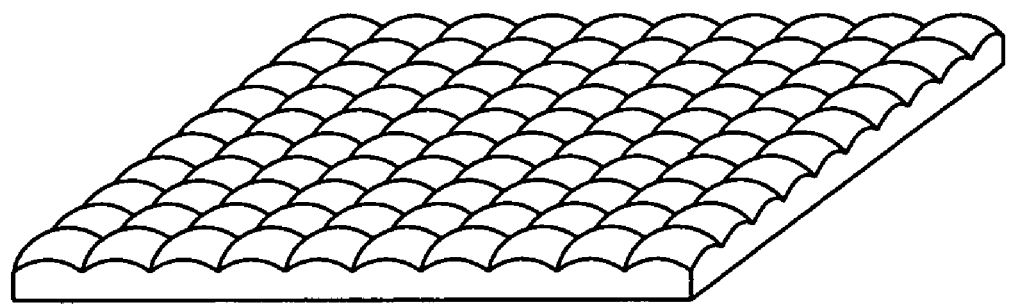

FIG. 10(B) shows a perspective view of a microlens array. The microlens array is formed so that a plurality of plano-convex lenses are connected in a matrix shape. Also in the case of using the microlens array, light is condensed at each convex portion of the lens to control a traveling direction thereof as the case of using the lenticular lens. Consequently, only an image for right eye is reflected onto a right eye and only an image for left eye is reflected onto a left eye with the result that a three-dimensional image can be recognized.

By the use of optical systems that can effectively utilize light without shielding such as a lenticular lens and a microlens array, a three-dimensional image can be prevented from having a significantly lower luminance than a two-dimensional image.

On the other hand, a parallax barrier is more easily subjected to an alignment with respect to a pixel than the lenticular lens or the microlens array described above, and can be manufactured easily.

Embodiment 2

The present embodiment will describe structures of a signal line driver circuit and a scan line driver circuit in an active matrix display device according to the present invention, which have a function of switching a scanning direction.

Figure 12:
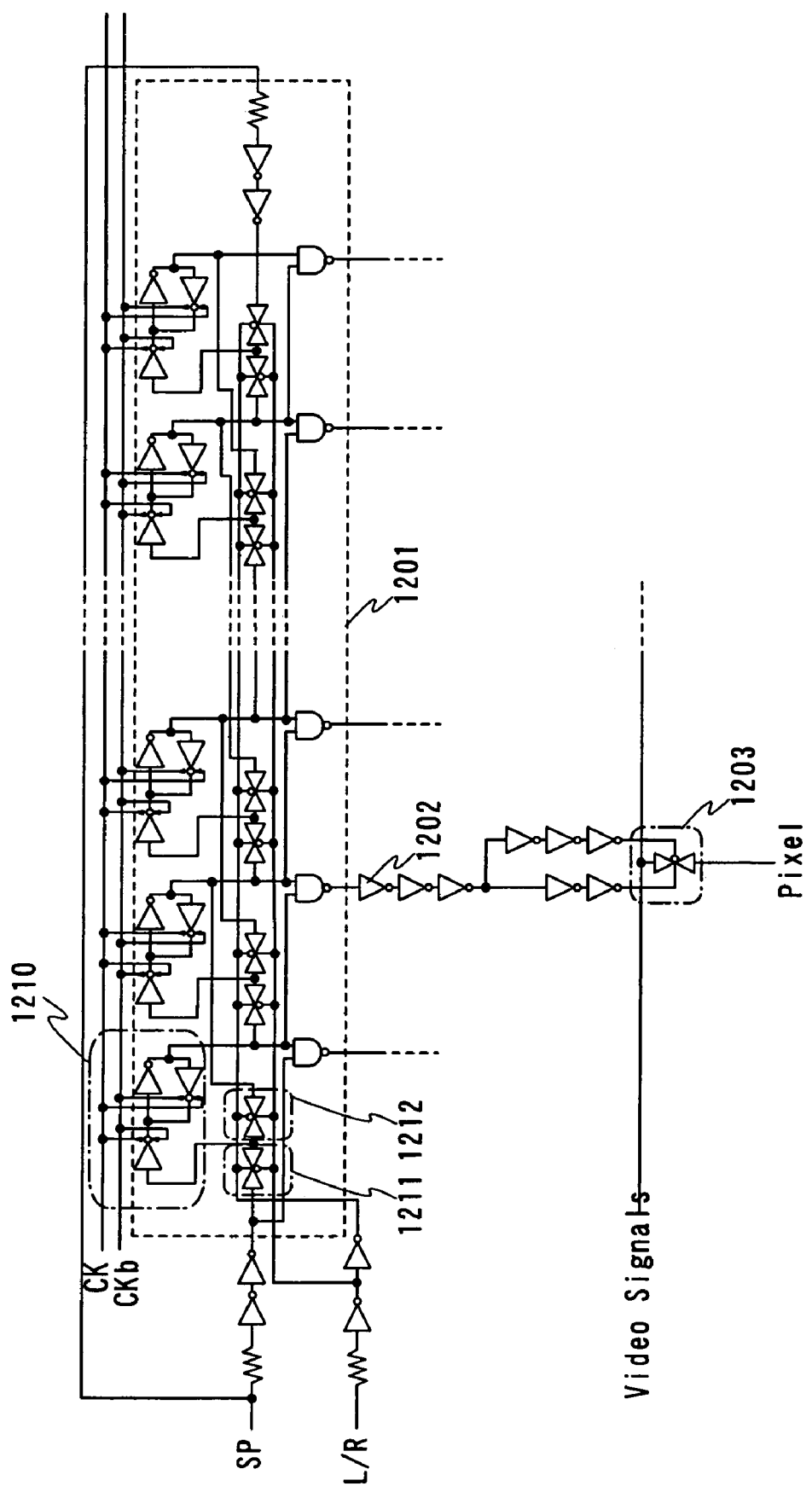
FIG. 12 is a circuit diagram of an analog-driving signal line driver circuit that is able to switch a scanning direction.

FIG. 12 shows a circuit diagram of a signal line driver circuit according to the present embodiment. The signal line driver circuit shown in FIG. 12 corresponds to analog video signals. In FIG. 12, reference numeral 1201 denotes a shift register, which generates a timing signal that determines the timing of sampling a video signal in accordance with a clock signal CK, an inversion clock signal CKb by inverting the clock signal CK, and a start pulse signal SP.

In addition, in the shift register 1201, a plurality of flip-flop circuits 1210 and a plurality of transmission gates 1211 and 1212, of which two correspond to each flip-flop circuit 1210, are provided. Switching of the transmission gates 1211 and 1212 is controlled by a switching signal L/R, and one of the transmission gates 1211 and 1212 is switched on while the other is switched off.

When the transmission gate 1211 is switched on, the shift resister 1201 functions as a shift register that shifts to the right since a start pulse signal is given to the leftmost flip-flop circuit 1210. On the contrary, when the transmission gate 1212 is switched on, the shift resister 1201 functions as a shift register that shifts to the left since a start pulse signal is given to the rightmost flip-flop circuit 1210.

A timing signal generated in the shift register 1201 is buffered and amplified by a plurality of inverters 1202, and transmitted to a transmission gate 1203. Although FIG. 12 shows the subsequent circuit (here, the inverters 1202 and the transmission gate 1203) for only one of outputs of the shift register, a plurality of subsequent circuits corresponding to the other outputs are provided in practice.

Switching of the transmission gate 1203 is controlled by the buffered and amplified timing signal. When the transmission gate 1203 is switched on, a video signal is sampled and supplied to each pixel in a pixel portion. In the case of the shift register 1201 functioning as a shift register that shifts to the right, a column-scanning direction is headed from left to right. In the case of the shift register 1201 functioning as a shift register that shifts to the left, a column-scanning direction is headed from right to left.

Figure 13:
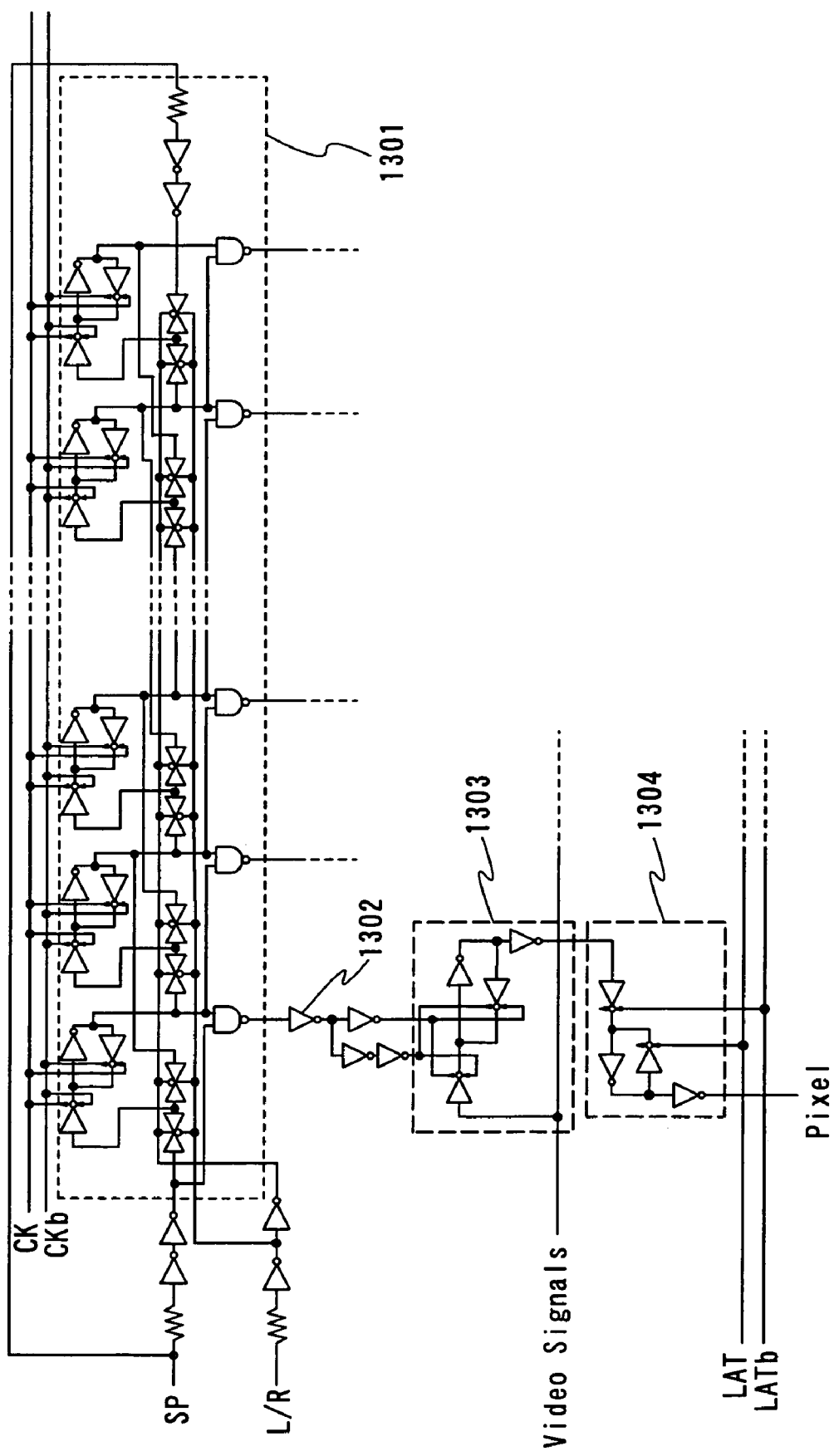
FIG. 13 is a circuit diagram of a digital-driving signal line driver circuit that is able to switch a scanning direction.

Next, FIG. 13 shows a circuit diagram of a signal line driver circuit according to the present embodiment. The signal line driver circuit shown FIG. 13 corresponds to digital video signals. In FIG. 13, reference numeral 1301 denotes a shift register, which has the same structure as the shift resister 1201 shown in FIG. 12, and switching of a scanning direction is controlled by a switching signal L/R.

A timing signal generated in the shift register 1301 is buffered and amplified in an inverter 1302, and then, input to a latch 1303. Although. FIG. 13 shows the subsequent circuit (here, the inverters 1302, the latch 1303, a latch 1304) only for one of outputs of the shift register 1301, a plurality of subsequent circuits corresponding to the other outputs are provided in practice.

The latch 1303 latches a video signal in accordance with the timing signal. Although FIG. 13 shows only one latch 1303, a plurality of latches 1303 are provided in practice, and video signals are sequentially latched respectively in accordance with timing signals. This order of latching can have a direction switched from the left to the right latch 1303 or from the right to left latch 1303 in accordance with a switching signal L/R.

When video signals are latched in all of the latches 1303, the video signals held in the latches 1303 are transmitted at once to the subsequent latches 1304 and latched in accordance with a latch signal LAT and its inversion signal LATh. Then, the video signals latched in the latches 1304 are supplied to corresponding pixels.

Figure 14:
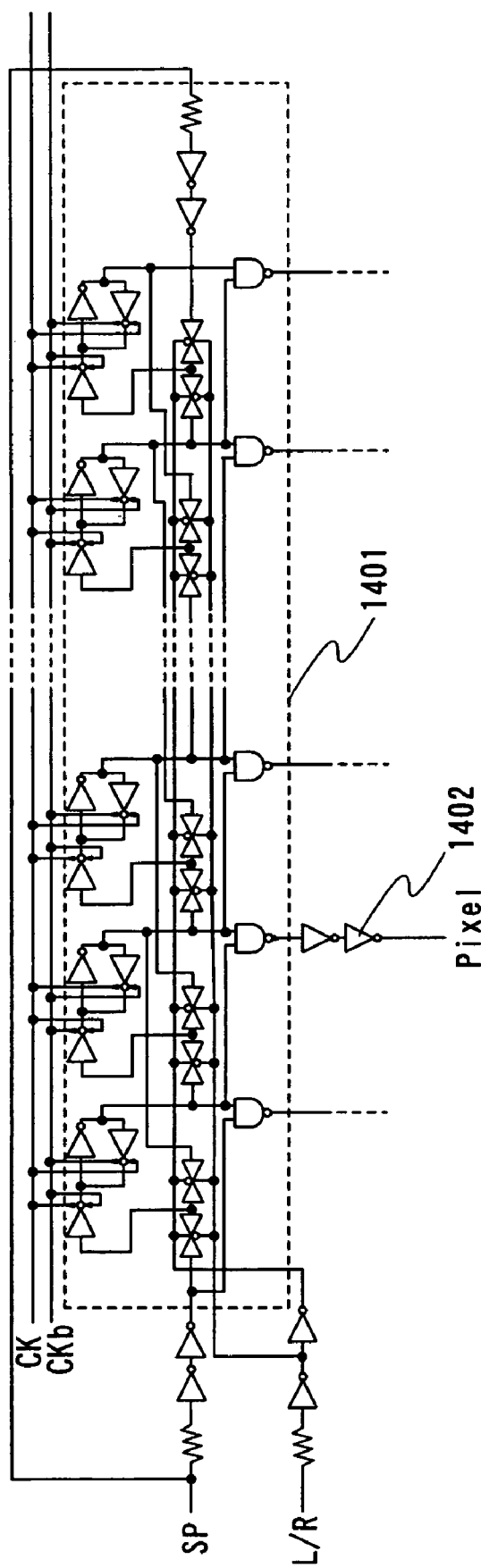
FIG. 14 is a circuit diagram of a scan line driver circuit that is able to switch a scanning direction.
Figure 15:
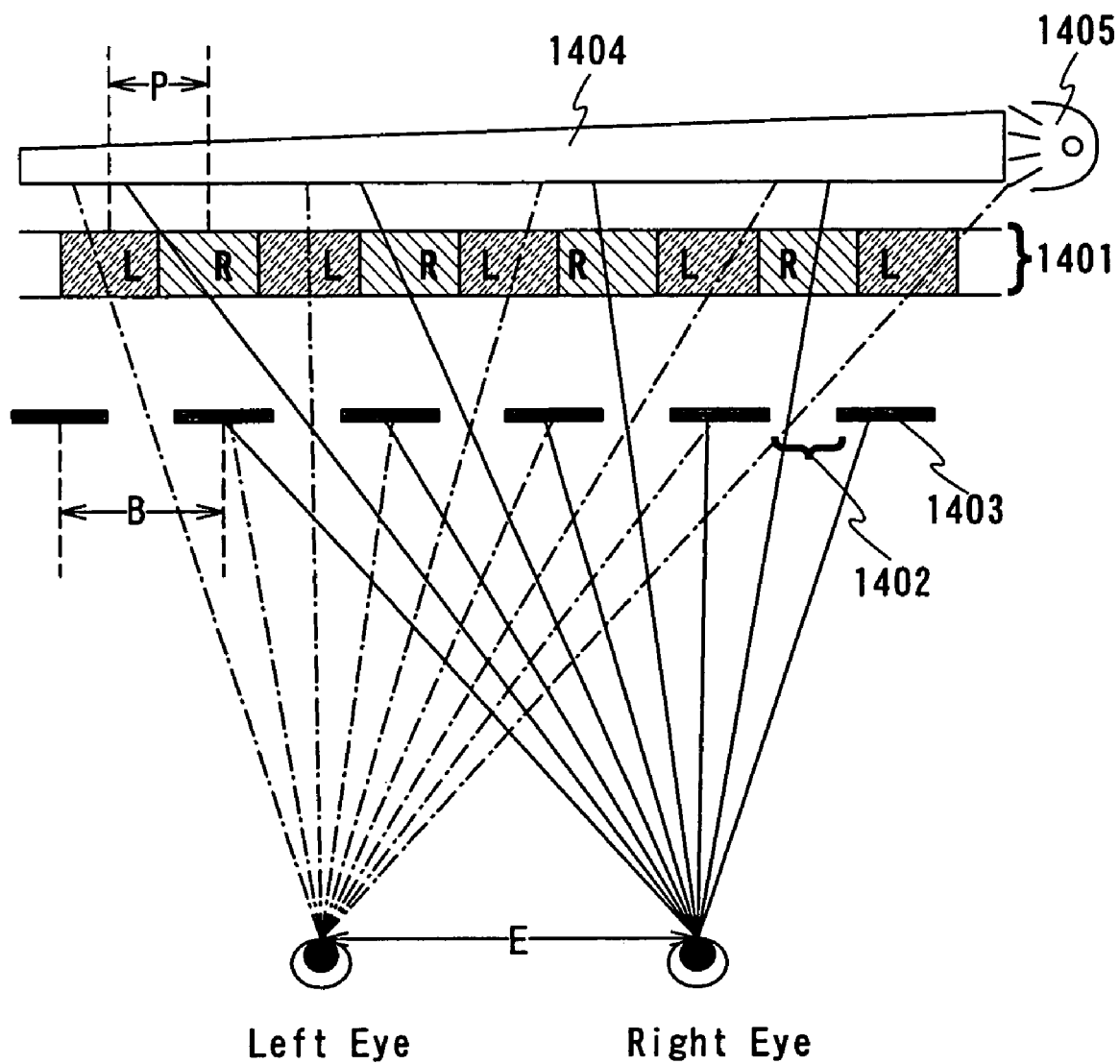
FIG. 15 is prior art, which is a diagram showing a positional relationship of a liquid crystal panel, an optical system, and both eyes in displaying a three-dimensional image.
Figure 16:
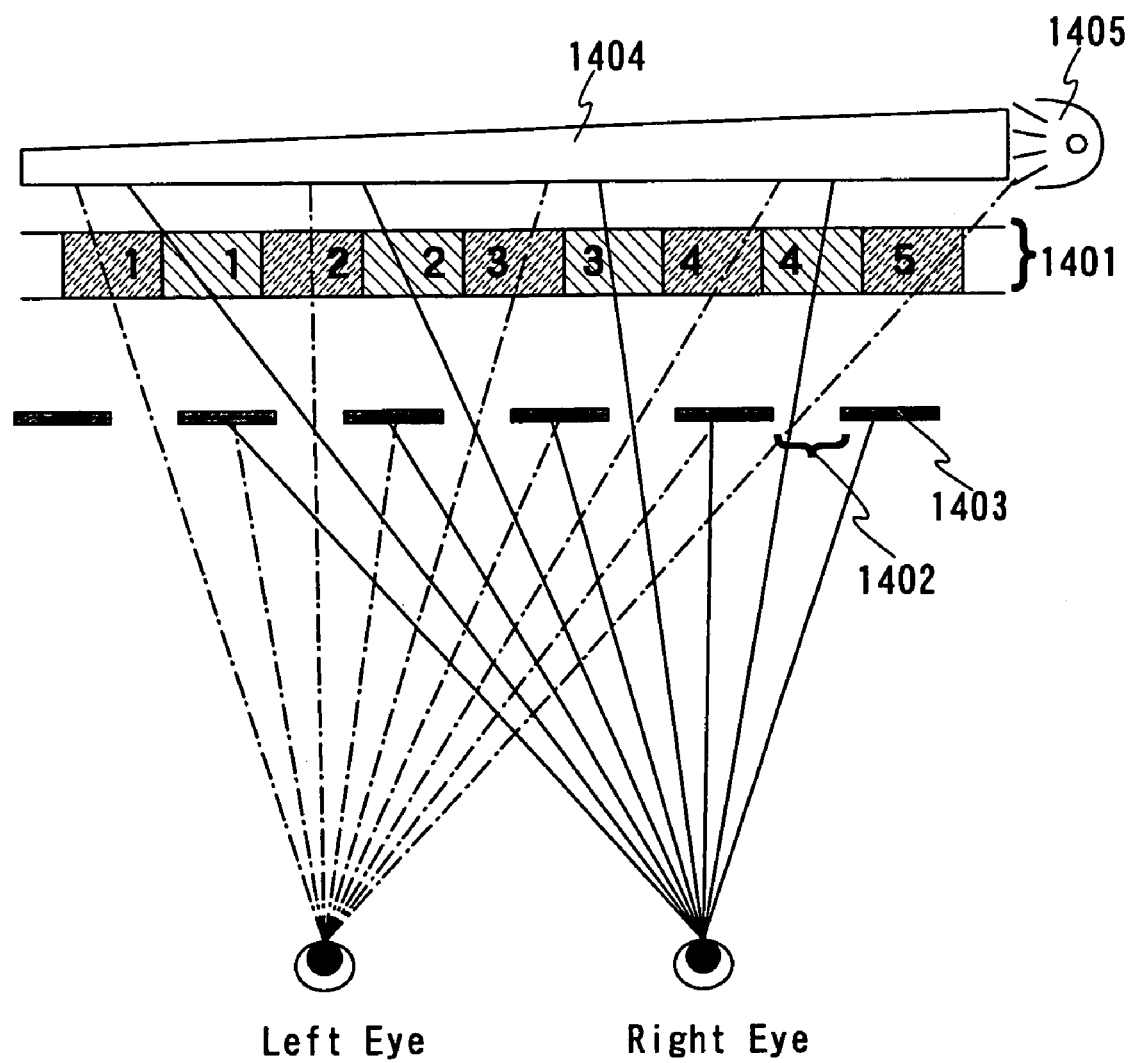
FIG. 16 is prior art, which is a diagram showing a positional relationship of a liquid crystal panel, an optical system, and both eyes in displaying a two-dimensional image.
Figure 17:
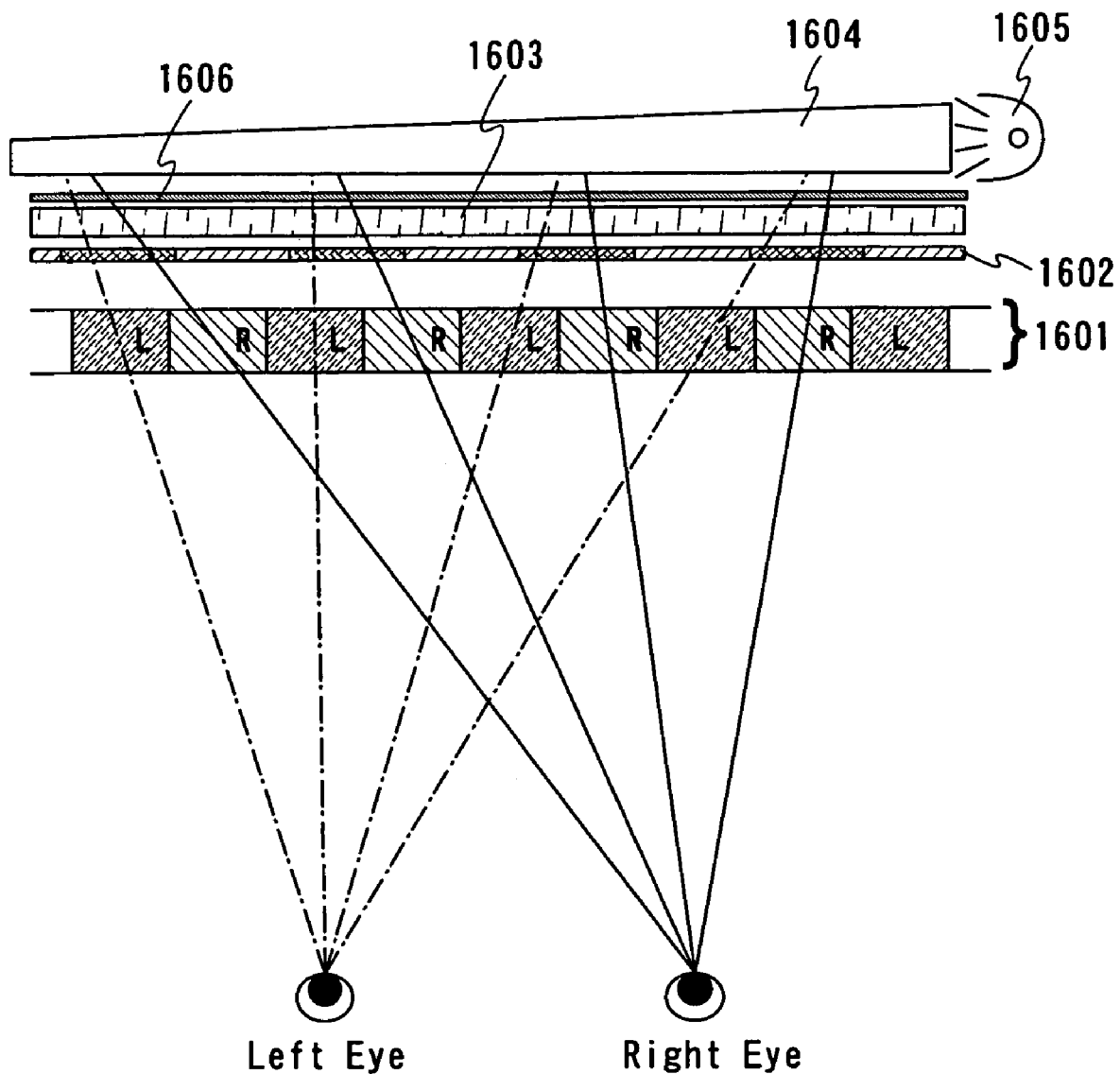
FIG. 17 is prior art, which is a diagram showing a positional relationship of a liquid crystal panel, an optical system, and both eyes in displaying a three-dimensional image.
Figure 18:
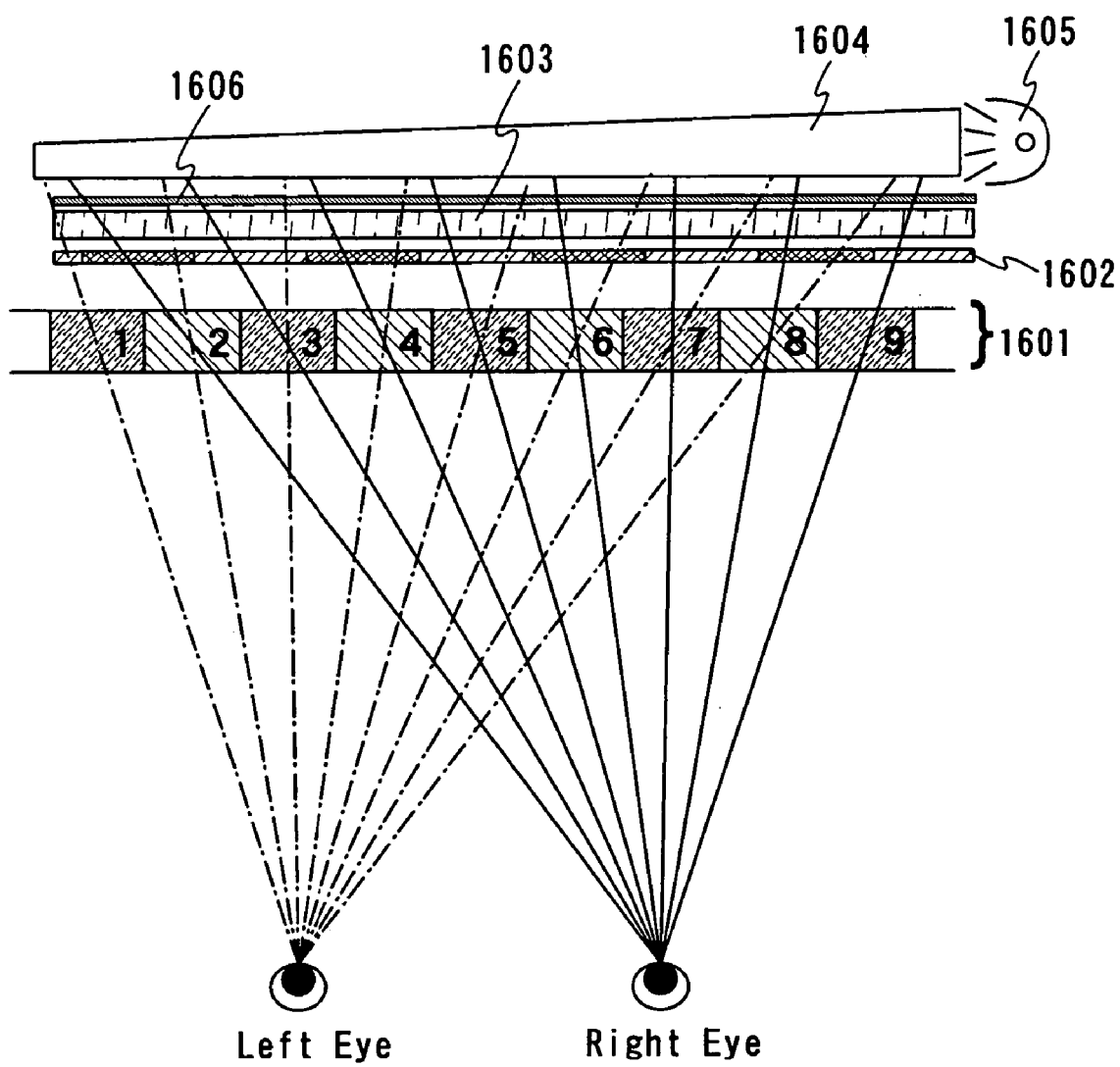
FIG. 18 is prior art, which is a diagram showing a positional relationship of a liquid crystal panel, an optical system, and both eyes in displaying a two-dimensional image.

Next, FIG. 14 shows a circuit diagram of a scan line driver circuit according to the present embodiment. In FIG. 14, reference numeral 1401 denotes a shift register, which has the same structure as the shift resister 1201 shown in FIG. 12, and switching of a scanning direction is controlled by a switching signal L/R. However, a timing signal generated in the shift register 1401 is used for selecting each row of pixels.

A timing signal generated in the shift register 1401 is buffered and amplified in an inverter 1402, and then, input to pixels. Although FIG. 14 shows the subsequent circuit (here, the inverters 1402) for only one of outputs of the shift register 1401, a plurality of subsequent circuits corresponding to the other outputs are provided in practice.

The driver circuits shown in the present embodiment are some examples of driver circuits that can be used for a display device according to the present invention, and the present invention is not limited to this.

The present embodiment can be implemented freely in combination with Embodiment 1.

Embodiment 3

The present embodiment will describe an example of using a display device that can display a three-dimensional image with the use of random dot stereogram for a display portion of an electronic device, in particular, a mobile electronic device.

Figure 20:
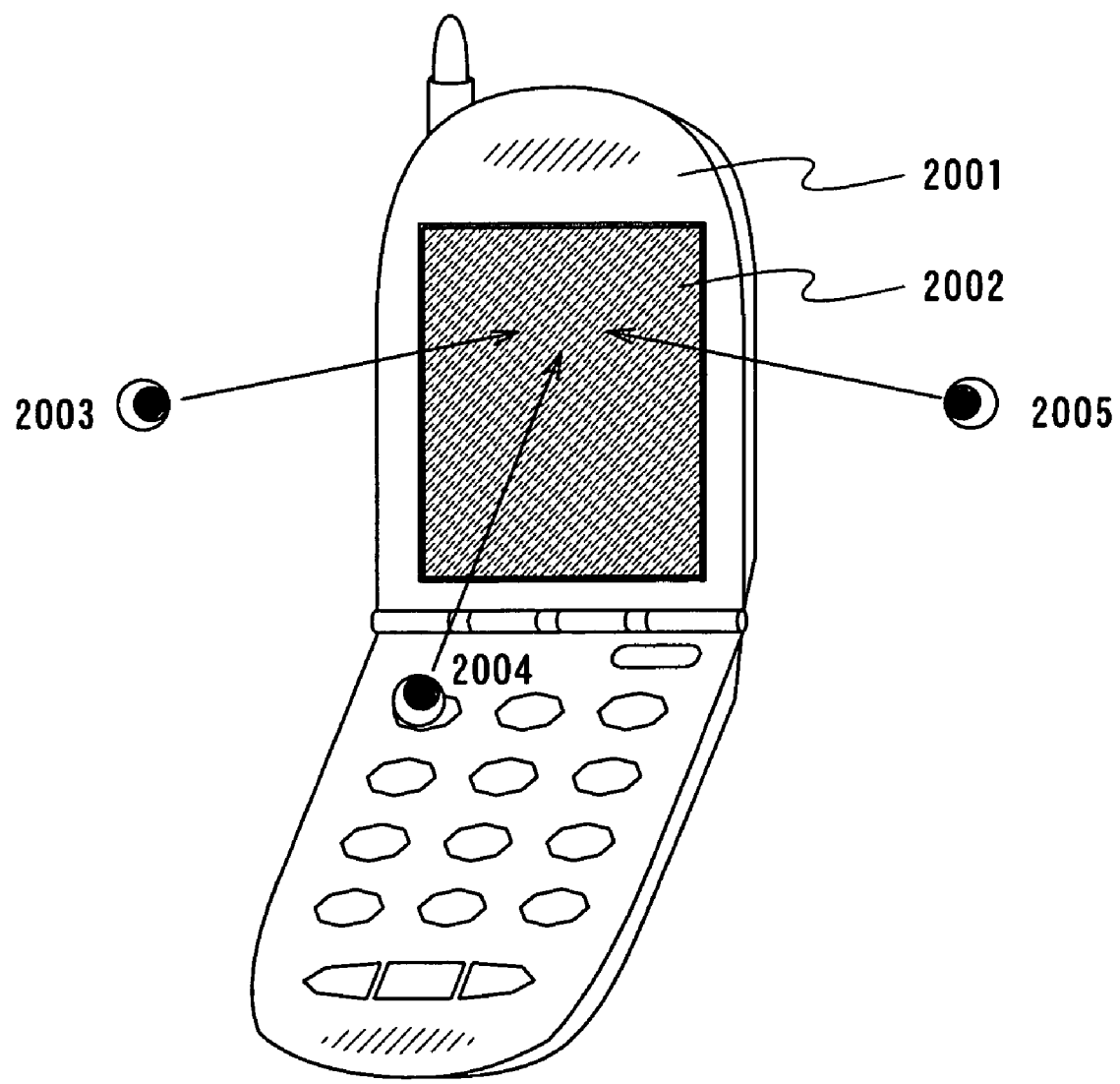
FIG. 20 is a diagram of a mobile phone that can display a three-dimensional image with the use of random dot stereogram.

FIG. 20 shows an example of a mobile phone that can display a three-dimensional image with the use of random dot stereogram. Reference numeral 2001 denotes a mobile phone, and a display device that can display a three-dimensional image with random dot stereogram is used for a display portion 2002.

In random dot stereogram, randomly dispersed dots seem to be drawn superficially when a screen is brought into focus as usual to have a view or a visual point is out of alignment by a certain degree or more on the basis of the squarely face in front of a screen. However, a three-dimensional image can be recognized by moving the focus front or back while a screen is looked squarely in the eye.

The principle above is utilized in the present embodiment. When a viewer has a sight line headed squarely in front of a screen as shown by reference numeral 2004, it is possible to recognize a three-dimensional image. When a viewer has a sight line headed from a direction out of the squarely face by a predetermined angle or more as shown by reference numerals 2003 and 2005, it is possible to recognize only dispersed dots.

A virtual image formed by random dot stereogram has a depth determined by a distance between both eyes of a viewer.

Since the configuration described above can prevent information displayed on a screen from being leaked to a third party looking into the screen from the side, personal information can be protected effectively.

Although the mobile phone is given as an example in the present embodiment, the present invention is not limited to this, and the present invention can be applied to personal digital assistants besides a mobile phone and another electronic devices. In particular, in the case of mobile electronic devices, it is effective that the mobile electronic devices can be used regardless of location even in the case where it is desired to block leaks of information from a screen.

Embodiment 4

The present embodiment will describe an example of a structure of a light-emitting element that is used for a display device according to the present invention.

Figure 21:
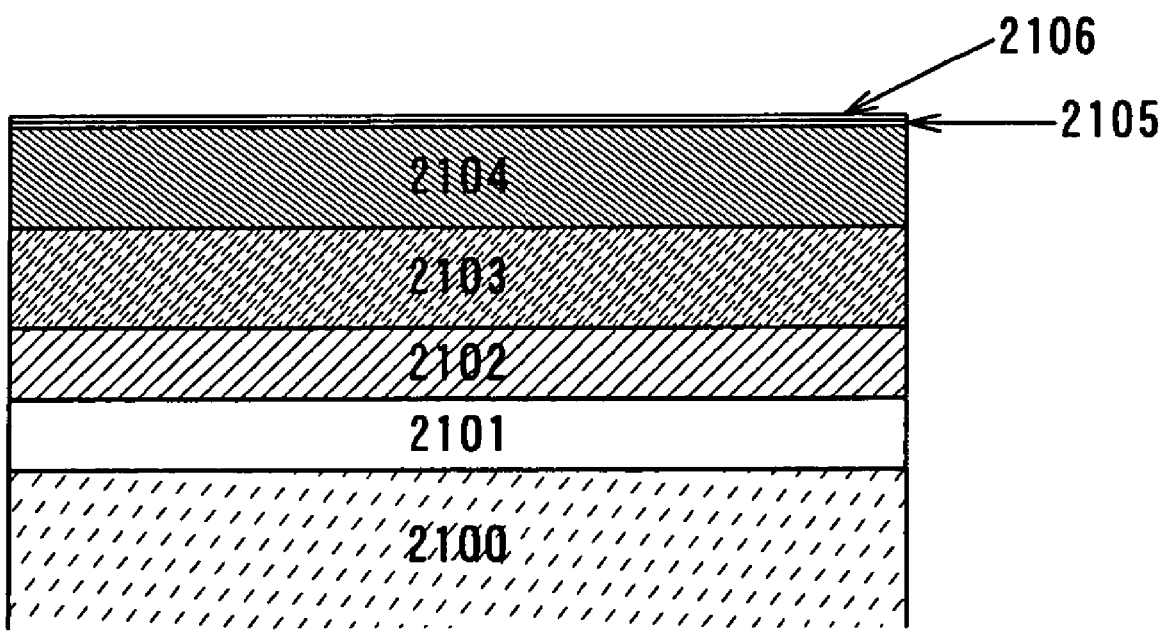
FIG. 21 is a diagram showing a structure of a light-emitting element (device?).

FIG. 21 shows a sectional view of a light-emitting element that is used in the present embodiment. As a structure of the element, copper phthalocyanine (CuPc) with a film thickness of 20 nm as a hole injection layer 2101, 4,4'-bis [N-(1-naphtyle)-N-phenyl-amino]-biphenyl (hereinafter, referred to as α-NPD) with a film thickness of 40 nm as a hole transport layer 2102, $Alq_3$ with quinacridone (DMQd) added, which has a film thickness of 37.5 nm, as a light-emitting layer 2103, $Alq_3$ with a film thickness of 37.5 nm as an electron transport layer 2104, $CaF_2$ with a film thickness of 1 nm as an electron injection layer 2105, and a cathode 2106 comprising Al are sequentially laminated on an anode 2100 formed of ITO that is a transparent conductive film.

Next, an explanation will be given for a method of manufacturing the light-emitting element that has the laminated structure shown in FIG. 21.

First, after a substrate that has an anode using ITO is subjected to heat treatment at 150° C. for 30 minutes in an atmosphere of vacuum, evaporation is used to deposit CuPc with a film thickness of 20 nm at a deposition rate of 0.1 nm/sec.

Next, evaporation is used to deposit α-NPD with a film thickness of 40 nm at a deposition rate of 0.2 nm/sec. Then, evaporation is used to deposit $Alq_3$ with DMQd added, which has a film thickness of 37.5 nm, by co-evaporation of $Alq_3$ and DMQd, where the added DMQd has a concentration from 0.001 wt % to 0.35 wt % and $Alq_3$ is deposited at a deposition rate of 0.2 nm/sec.

Next, evaporation is used to deposit $Alq_3$ with a film thickness of 37.5 nm at a deposition rate of 0.2 nm/sec. The $Alq_3$ can be deposited continuously after the deposition of the $Alq_3$ with DMQd added by separating DMQd as an evaporation source with a means such as a shutter.

Next, evaporation is used to deposit $CaF_2$ with a film thickness of 1 nm at a deposition rate of 0.01 nm/sec. $CaF_2$ is vaporized by resistance hearing to perform the deposition. Then, evaporation is used to deposit Al with a film thickness of 20 nm. Al is vaporized by resistance hearing to perform the deposition.

By performing theses series of processes continuously without exposing to air, the light-emitting element can have reliability enhanced.

Although CuPc is used as the hole injection layer 2101 in FIG. 21, poly(ethylenedioxy)thiophene (PEDOT) may be used in stead of CuPc. In this case, spin coating is used at 500 rpm to apply solution of PEDOT with ethanol as a solvent on the ITO that serves as the anode for a film thickness of 60 nm. Then, a heat treatment is performed to vaporize the ethanol included in the film of PEDOT. This heat treatment is performed at 80° C. for 10 minutes, and then, at 200° C. for approximately 1 hour. Then, a heat treatment is performed at 150° C. for approximately 30 minutes in an atmosphere of vacuum. The subsequent processes are similar to those of the case of using CuPc as the hole injection layer 2101.

The laminated structure of the light-emitting element in the present embodiment and the film thicknesses thereof are not limited to the structure shown in FIG. 2. In order to obtain light from the cathode side, there is a method of using ITO that has a work function made smaller by adding Li, besides a method of making a film thickness thin. In short, the light-emitting element that is used in the present invention has a structure for emitting light from both of the anode side and the cathode side.

In the case of depositing an electroluminescent layer with evaporation, it is desirable to subject an inside wall of a chamber for performing evaporation to electrolytic polishing, and moisture can be removed efficiently by using a cryopump for evacuation.

The present embodiment can be implemented in combination with Embodiment 1 or 2.

Embodiment 5

A panel that has a light-emitting element sealed and a module that has an IC mounted on the panel, which includes circuits such as a controller and a power supply circuit, both correspond to modes of a light-emitting device. The present embodiment will describe an example of a specific configuration of a light-emitting device in a state of a module.

Figure 22:
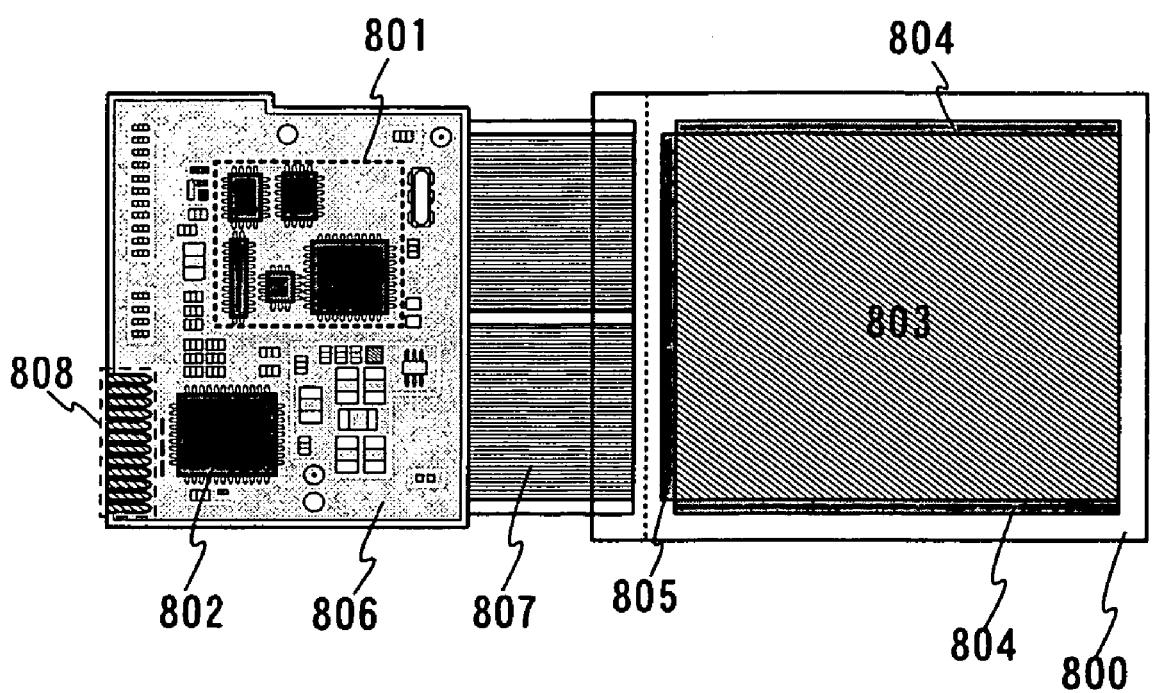
FIG. 22 is an external view of a module that has a controller and a power supply circuit mounted on a panel.

FIG. 22 shows an external view of a module that has a controller 801 and a power supply circuit 802 mounted on a panel 800. In the panel 800, a pixel portion 803 that has a light-emitting element provided in each pixel, a scan line driver circuit 804 for selecting the pixel of the pixel portion 803, and a signal line driver circuit 805 for supplying a video signal to the selected pixel are provided. In the present invention, the light-emitting element has a structure for emitting light from both electrodes.

In addition, a printed circuit board 806 has the controller 801 and the power supply circuit 802 provided, and various signals and a power supply voltage output from the controller 801 or the power supply circuit 802 are supplied through a FPC 807 to the pixel portion 803, the scan line driver circuit 804, and the signal line driver circuit 805 of the panel 800. A power supply voltage and various signals to the printed circuit board 806 are supplied through an interface (I/F) portion 808 in which has a plurality of input terminals are arranged.

Although the printed circuit board 806 is mounted on the panel 800 with the FPC in the present embodiment, the present invention is not always limited to this configuration. COG (Chip on Glass) may be used to mount the controller 801 and the power supply circuit 802 directly on the panel 800.

Besides, in the printed circuit board 806, there can be a noise on power supply voltage or a duller leading edge of a signal due to causes such as capacitance formed between leading wirings and resistance of the wirings themselves. Consequently, various elements such as a capacitor and a buffer may be provided in the printed circuit board 806 to prevent a noise on power supply voltage or a duller leading edge of a signal.

The controller 801 may have a function of switching various signals to be input to the scan line driver circuit 804 or the signal line driver circuit 805 so as to switch appropriately a scanning direction in the pixel portion 803 in accordance with image signals for two dimension and image signals for three dimension, which are supplied through the interface portion 808.

The present embodiment can be implemented freely in combination with Embodiments 1, 2, and 4.

INDUSTRIAL APPLICABILITY

Since a light-emitting device is used in the present invention, it is unnecessary to use parts such as a light source and a light guiding plate unlike a liquid crystal panel and it is possible to prevent the device itself from becoming bulky. Additionally, when the light-emitting device is used, a side for displaying a two-dimensional image and a side for displaying a three-dimensional image can be used differently with one panel. Therefore, since the optical system 102 is not provided between a viewer and the panel in displaying a two-dimensional image, images of all pixels can be reflected onto both eyes of the viewer, and a two-dimensional image can be recognized without sacrificing a half of the resolution unlike the Patent Document 1.

The invention claimed is:

1. A display device comprising:
a light-emitting device having a plurality of pixels;
an optical system provided at one side of the light-emitting device; and
a shield means that can shield light to be transmitted through the light-emitting device,
wherein a light-emitting element is provided in each of the plurality of pixels,
wherein two electrodes of the light-emitting element both have translucency, and
wherein the optical system makes light emitted from one of two adjacent pixels of the plurality of pixels incident into a left eye of a viewer and makes light emitted from the other incident into a right eye of the viewer by controlling a traveling direction of light emitted from the plurality of pixels.

2. The display device according to claim 1, wherein the optical system is a lenticular lens, a microlens array, or a parallax barrier.

3. The electronic equipment according to claim 1, wherein the shield means is provided in the light-emitting device.

4. The electronic equipment according to claim 1, wherein the shield means can beat either side of the light-emitting device.

5. The electronic equipment according to claim 1, wherein the shield means can be moved between one side of the light-emitting device and the other side of the light-emitting device.

6. A display device comprising:
a light-emitting device having a plurality of pixels; and
an optical system provided at one side of the light-emitting device,
wherein a light-emitting element and first and second shield means that can shield light are provided in each of the plurality of pixels,
wherein two electrodes of the light-emitting element both have translucency, wherein light emitted from a portion of a region of the light-emitting element to one side of the light-emitting element is shielded by the first shield means and light emitted from the other region of the light-emitting element to the other side of the light-emitting element is shielded by the second shield means, and wherein the optical system makes light emitted from one of two adjacent pixels of the plurality of pixels incident into a left eye of a viewer and makes light emitted from the other incident into a right eye of the viewer by controlling a traveling direction of light emitted from the plurality of pixels.

7. The device according to claim 6, wherein the optical system is a lenticular lens, a microlens array, or a parallax barrier.

8. A display device comprising:

a light-emitting device having a plurality of pixels; and an optical system provided at one side of the light-emitting device, wherein first and second light-emitting elements and first and second shield means that can shield light are provided in each of the plurality of pixels, wherein two electrodes of the first and second light-emitting elements both have translucency, wherein light emitted from the first light-emitting element to one side of the light-emitting device is shielded by the first shield means and light emitted from the second light-emitting element to the other side of the light-emitting device is shielded by the second shield means, and wherein the optical system makes light emitted from one of two adjacent pixels of the plurality of pixels incident into a left eye of a viewer and makes light emitted from the other incident into a right eye of the viewer by controlling a traveling direction of light emitted to the one side of the light-emitting device.

9. The device according to claim 8, wherein the optical system is a lenticular lens, a microlens array, or a parallax barrier.

10. A display device comprising:

a light-emitting device having a plurality of pixels; and an optical system provided at one side of the light-emitting device, wherein first and second light-emitting elements and first and second shield means that can shield light are provided in each of the plurality of pixels, wherein the first and second light-emitting elements comprise two electrodes that both have translucency, wherein light emitted from the first light-emitting element to one side of the light-emitting device is shielded by the first shield means and light emitted from the second light-emitting element to the other side of the light-emitting device is shielded by the second shield means, wherein one of the first light-emitting element and the second light-emitting element is turned off while the other emits light, and wherein the optical system makes light emitted from one of two adjacent pixels of the plurality of pixels incident into a light eye of a viewer and light emitted from the other incident into a right eye of the viewer by controlling a traveling direction of light emitted to the one side of the light-emitting device.

11. The device according to claim 10, wherein the optical system is a lenticular lens, a microlens array, or a parallax barrier.

12. An electronic equipment comprising:

a display device which has a light-emitting device having a plurality of pixels and an optical system provided at one side of the light-emitting device; and a shield means that can shield light to be transmitted through the light-emitting device, wherein a light-emitting element is provided in each of the plurality of pixels, wherein two electrodes of the light-emitting element both have translucency, wherein the optical system makes light emitted from one of two adjacent pixels of the plurality of pixels incident into a left eye of a viewer and makes light emitted from the other incident into a right eye of the viewer by controlling a traveling direction of light emitted from the plurality of pixels, and wherein the shield means can be moved to a position so as to exist on the opposite side of the light-emitting device from the viewer.

13. The electronic equipment according to claim 12, wherein the optical system is a lenticular lens, a microlens array, or a parallax barrier.

14. An electronic equipment according to claim 12, wherein random dot stereogram can he displayed using the light-emitting device.

15. An electronic equipment comprising:

a display device having a light-emitting device having a plurality of pixels and an optical system at one side of the light-emitting device; and a first shield means and a second shield means that can shield light to be transmitted through the light-emitting device, wherein a light-emitting element is provided in each of the plurality of pixels, wherein two electrodes the light-emitting element both have translucency, wherein the optical system makes light emitted from one of two adjacent pixels of the plurality of pixels incident into a left eye of a viewer and makes light emitted from the other incident into a right eye of the viewer by controlling a traveling direction of light emitted from the plurality of pixels, and wherein the first shield means can be moved to a position so as to exist on the opposite side of the light-emitting device from the optical system and the second shield means can be moved to a position so as to exist on the opposite side of the optical system from the optical system.

16. The electronic equipment according to claim 15, wherein the optical system is a lenticular lens, a microlens array, or a parallax barrier.

17. The electronic equipment according to claim 15, wherein random dot stereogram can be displayed using the light-emitting device.

* * * * *